(12) United States Patent
Shore et al.

(10) Patent No.: US 6,353,461 B1
(45) Date of Patent: Mar. 5, 2002

(54) MULTIPLE CAMERA VIDEO ASSIST CONTROL SYSTEM

(75) Inventors: Morris M. Shore, Sudbury, MA (US); Edward L. Elliott, San Francisco, CA (US)

(73) Assignee: Panavision, Inc., Woodland Hills, CA (US)

(*) Notice: Subject to any disclaimer, the term of this patent is extended or adjusted under 35 U.S.C. 154(b) by 0 days.

(21) Appl. No.: 09/095,771

(22) Filed: Jun. 11, 1998

Related U.S. Application Data

(60) Provisional application No. 60/049,616, filed on Jun. 13, 1997.

(51) Int. Cl.[7] .......................... H04N 5/262; H04N 5/92
(52) U.S. Cl. ..................... 348/722; 348/239; 348/578; 348/423.1; 386/52; 345/328
(58) Field of Search ............................... 348/722, 239, 348/385, 423.1, 429, 432.1, 578, 474, 591, 739; 345/328, 340, 348; 386/52; H04N 5/92, 5/262

(56) References Cited

U.S. PATENT DOCUMENTS

| | | | |
|---|---|---|---|
| 5,206,929 A | | 4/1993 | Langford et al. ............ 395/159 |
| 5,724,474 A | | 3/1998 | Oguro et al. .................. 386/95 |
| 5,745,167 A | | 4/1998 | Kageyu et al. .............. 348/153 |
| 5,923,365 A | * | 7/1999 | Tamir et al. ................. 348/578 |
| 5,956,453 A | * | 9/1999 | Yaegashi et al. .............. 386/52 |
| 5,999,173 A | * | 12/1999 | Ubillos ....................... 345/328 |
| 6,044,198 A | * | 3/2000 | Otaka et al. .................. 386/52 |
| 6,064,793 A | * | 5/2000 | Furuyama .................... 386/52 |
| 6,067,126 A | * | 5/2000 | Alexander ................... 348/722 |
| 6,085,019 A | * | 7/2000 | Ito et al. ....................... 386/52 |
| 6,091,778 A | * | 7/2000 | Sporer et al. ................. 348/384 |
| 6,092,119 A | * | 7/2000 | Rossmere et al. ........... 345/328 |
| 6,094,522 A | * | 7/2000 | Ito et al. ....................... 386/52 |
| 6,154,600 A | * | 11/2000 | Newman et al. .............. 386/52 |

FOREIGN PATENT DOCUMENTS

JP 58-114673 A * 7/1983 ............ H04N/5/22

OTHER PUBLICATIONS

PCT International Search Report mailed Sep. 28, 1998.

* cited by examiner

*Primary Examiner*—Reinhard J. Eisenzopf
*Assistant Examiner*—Jean W. Désir
(74) *Attorney, Agent, or Firm*—Lyon & Lyon LLP

(57) ABSTRACT

Video assist control systems and methods for use in film/video production environments are presented which provide a link between production and post-production by storing and managing both recorded media and production information. Multiple video signals (including audio) may be selectively received and simultaneously digitally recorded and stored, along with time code information, with near instantaneous playback capability for multiple current and past recordings. Database functionality is incorporated to provide for entry and storage of information associated with each recording. The database provides searching capabilities to locate and retrieve past recordings, based on stored information, for playback review, editing and assembly of recordings or portions thereof. Editing functionality is provided including identification of action points, cut points for segmentation within recordings, and selection of active channels for selected segments upon playback so as to provide for sequential playback of assembled video portions from multiple recordings. Compositing functionality is further incorporated to allow playback of pre-existing material in superimposition with new material being recorded, thus allowing near real-time viewing of special effects.

7 Claims, 17 Drawing Sheets

Microfiche Appendix Included
(7 Microfiche, 605 Pages)

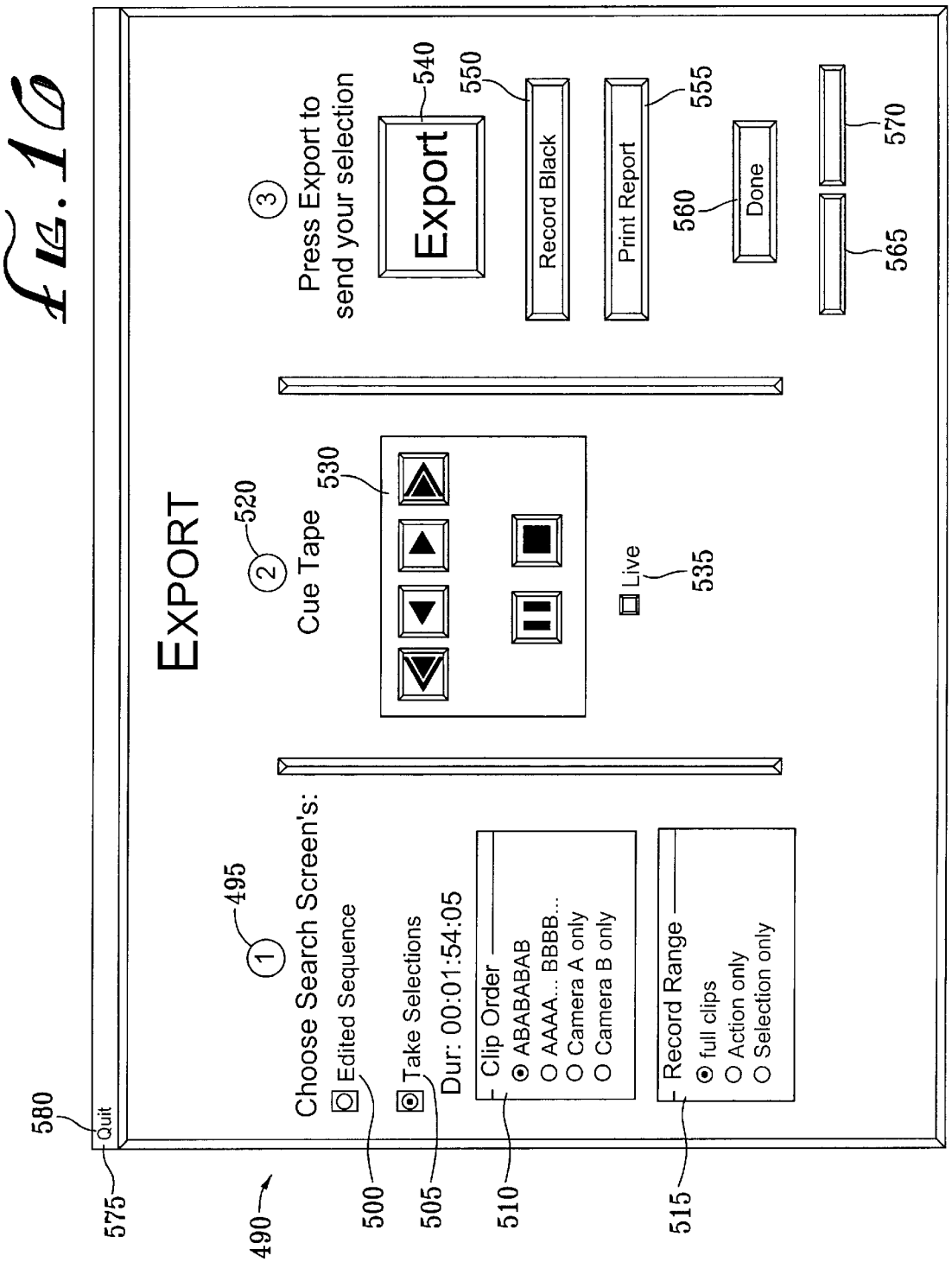

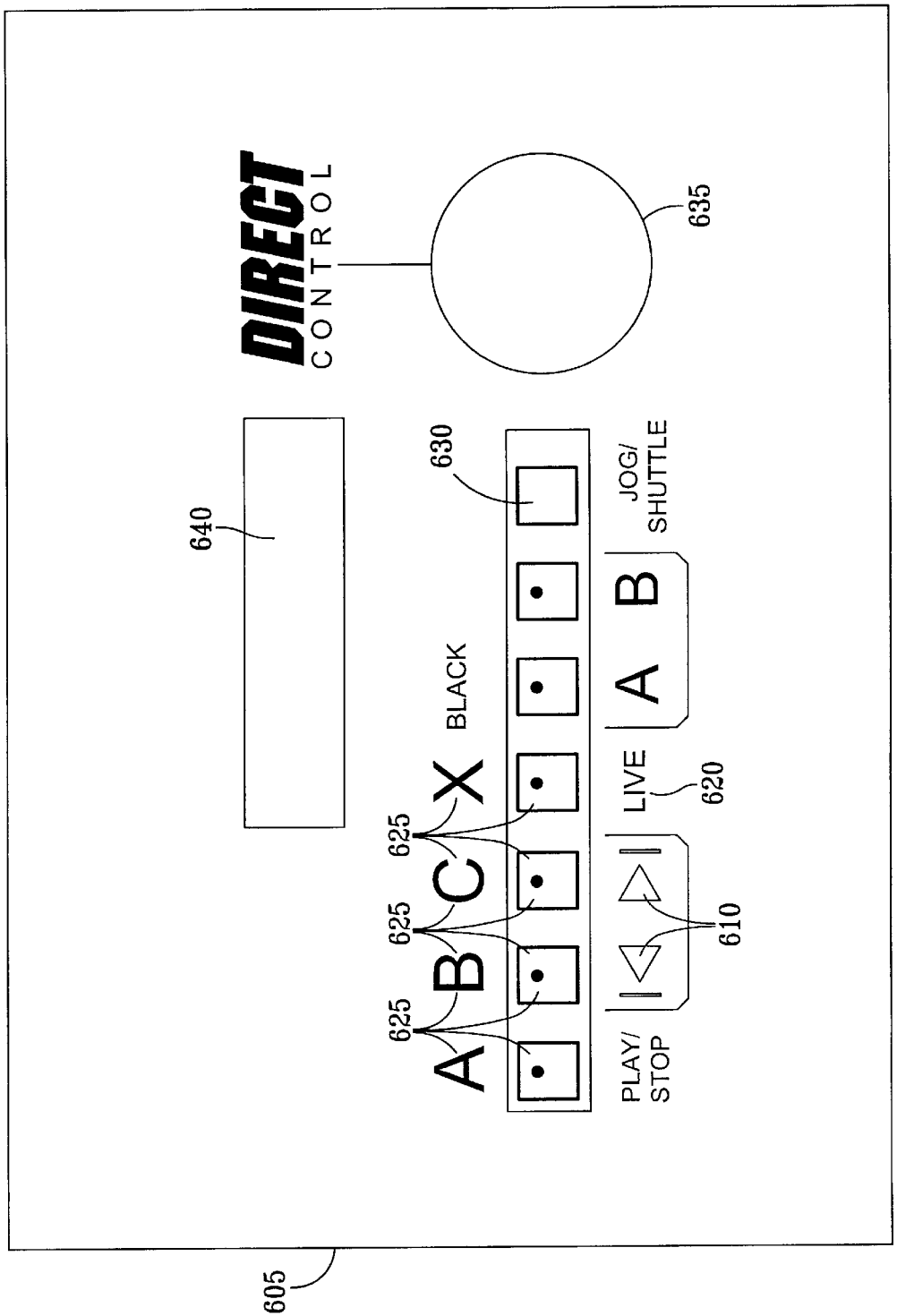

MULTIPLE CAMERA VIDEO ASSIST CONTROL SYSTEM

RELATED APPLICATION

This application claims the benefit of U.S. provision application No. 60/049,616 filed Jun. 13, 1997.

COPYRIGHT NOTICE/AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

MICROFICHE APPENDIX

This application includes seven (7) Microfiche Appendices.

FIELD OF THE INVENTION

The field of the present invention relates to motion picture and television production, including film or video generally and, more specifically, to video recording and editing. In particular, it relates to a video assist system and method for use in motion picture or television production which provides for digital recording and playback of video from multiple cameras with near instantaneous reviewing, editing, cutting, sequencing and assembling capabilities, and which provides a database that records and manages both media and production information.

BACKGROUND

Though not generally apparent from viewing the end products, production of motion pictures, television programming, and other film/video related projects is an involved and complicated process typically requiring recording of multiple takes of each scene in order to obtain the feel, look, emotion, timing, attitude and other characteristics that the director wants for the piece. Multiple cameras are often utilized for recording each take so that the director may select the most desirable camera angles to be viewed at any particular time. As well, many special effects require compositing of multiple recordings to obtain a desired result. From the resulting array of multiple camera, multiple take recordings, the director weaves his/her vision by piecing together select portions of the various recordings. Of course, an entire staff of production assistants—as evidenced by viewing credits—is also involved in this process to keep notes of takes (including descriptions, director instructions, identification of selection and cut points within takes for changing cameras, etc.) and to edit the film/video to eliminate non-action portions and to prepare compilation tapes for review—among numerous other functions.

In the past, the production process has primarily utilized analog equipment for the recording and editing functions with note taking being done manually by the production staff. Accordingly, significant wait times have been required for queuing of videotapes, retrieval of past recordings, elimination of recorded slack (non-action) time, and creation of review tapes, all of which required reference to the separate notes taken manually. Even with the recent introduction of some digital recording equipment into the production process (e.g., digital editors), only marginal improvements in production time have been realized since such equipment has heretofore not been practical for use processing multiple inputs, nor has it been capable of managing the voluminous notes compiled during the production process.

SUMMARY OF THE INVENTION

The present invention relates to video assist systems and methods for use in motion picture or television production which provide for digital recording and playback of video from multiple cameras with near instantaneous reviewing, editing, cutting, compositing, sequencing and assembling capabilities. The instant video assist systems and methods serve as a point of origin for a database that records and manages both media and production information for use on the set and in later stages of production.

The systems and methods herein may be utilized to digitally record and playback scene takes as they are being shot using the cameras' video taps as input sources. Fast random access playback of recorded materials (including intermediate portions of a take), a database of scene and take information (including comments, action and cut points), editing and import/export features provide a link to post-production which significantly reduces production times.

The video assist systems and methods detailed herein are adaptable to the various phases of production, including the variety of hardware configurations that may be utilized in differing production settings, and provide a consistent user interface across such hardware configurations. For example, the system is readily configurable to accommodate switching from a small two-channel tape-only system as might be used during field shooting (e.g., in a car or at a beach) to continued shooting on a stage with a fill four-camera digital disk system. Where jumping from traditional videotape-based video assist packages to using a nonlinear editing system on a stage would typically offer no coherency, the instant systems and methods provide a common database and consistent user interface throughout a production.

Accordingly, the preferred embodiments herein may provide one or more of the following objects and advantages:

- to provide an easy-to-use, film-style interface for controlling multi-camera recording, instant playback, cutting, and effects;
- to provide such a system and method which allows for near instantaneous access to multi-camera take recordings presently in production;
- to provide such a system and method which allows for efficient management and control of recording and playback of multiple digital channels;
- to provide such a system and method incorporating digital recording of video input from multiple cameras;
- to provide such a system and method which incorporates database structures and search capabilities to enhance and improve the efficiency of sequence selection, playback, editing, and other production and post-production tasks;
- to provide such a system and method which offers "real-time" editing of multiple camera inputs at the production set environment level;
- to provide such a system and method wherein the set environment may be more closely tied to the post-production edit environment;
- to provide such a system and method which allows for simultaneous record and playback of multiple cameras with near instantaneous playback of any or all cameras in any scene and take;

to provide such a system and method wherein intercutting and trimming may be done within a take;

to provide such a system and method which allows for assemble editing and trimming between takes to provide such a system and method which is adaptable to the various phases of production;

to provide such a system and method wherein a consistent interface is maintained across a variety of hardware configurations;

to provide such a system and method which accommodates hardware changes during the course of production; and, to provide such a system and method which records and manages both media and production information in common database.

Other objects and advantages of the present video assist systems and methods will become apparent to those skilled in the art from a review of the detailed description in conjunction with the accompanying drawings.

BRIEF DESCRIPTION OF THE DRAWINGS

FIG. 16 depicts an exemplary "Export Screen" according to a preferred embodiment herein.

FIG. 17 depicts an exemplary "Direct Control Box" according to a preferred embodiment herein.

DETAILED DESCRIPTION OF PREFERRED EMBODIMENTS

Figure 1:
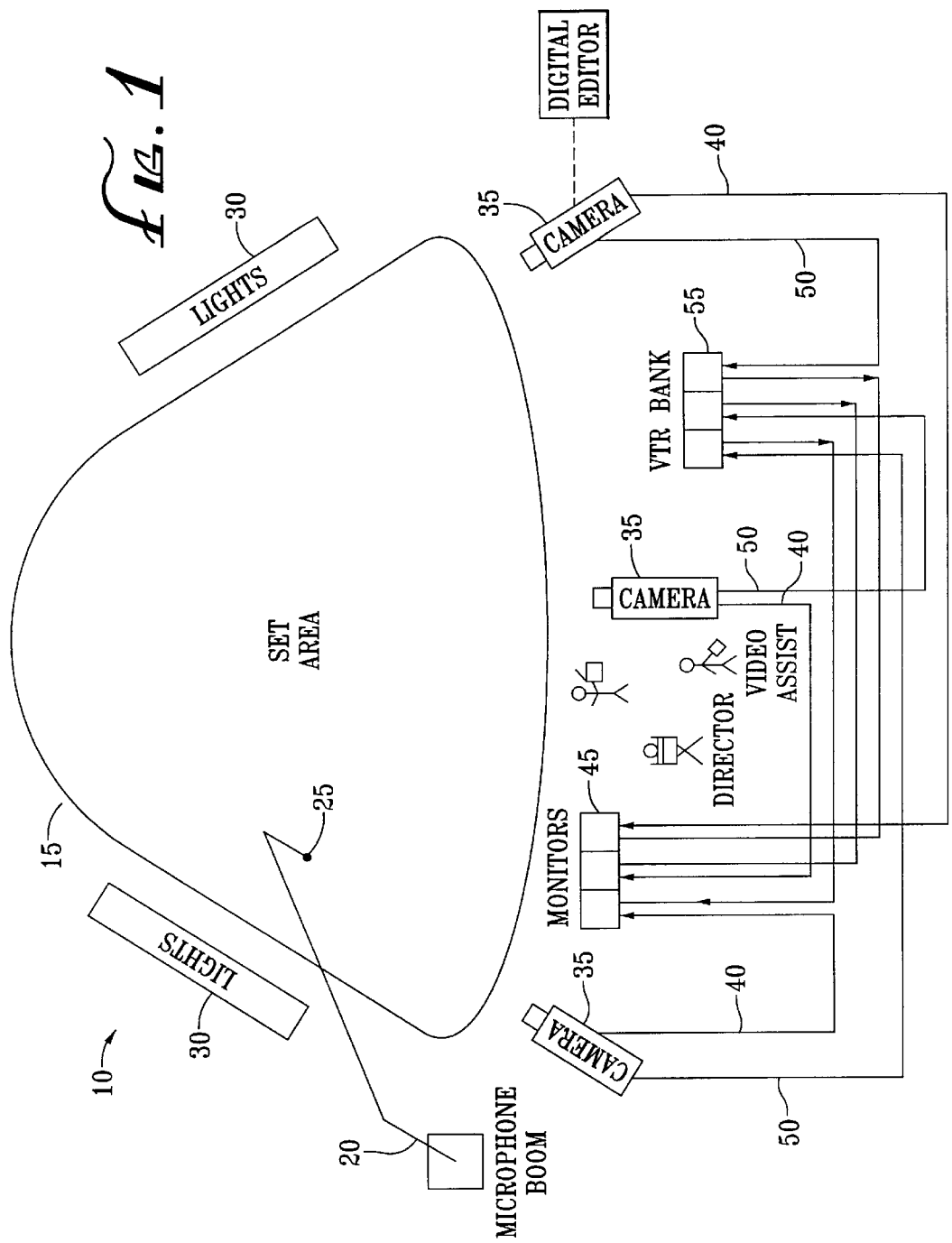
FIG. 1 is a simplified block diagram of an exemplary known production environment.

With reference to FIG. 1, a known conventional production environment 10 includes a set area 15 in which the action to be recorded is performed, a boom 20 movably suspending a microphone 25 over the set area to record audio for the performance, and lighting arrays 30 surrounding the set area 15. Cameras 35, typically at least two but ranging from one to four or more, are positioned along a portion of the set area 15 perimeter, typically on movable dollies, and may provide film only, film and/or video, or video only capabilities. In the case where cameras 35 provide video capability (as illustrated in FIG. 1), the cameras 35 include video leads 40 that may be connectable with monitors 45 for real-time viewing of the images being recorded by each respective camera 35. As well, in film and video applications, each camera 35 may further provide a video lead 50 connectable with a videotape recorder (VTR) 55 to simultaneously record the image being filmed by the camera 35. The VTR's 55 may also be connectable with the viewing monitors 45 to provide for review of previously recorded materials, e.g., in between takes for a scene.

Within the environment, and typically positioned so as to view both the set area 15 and the viewing monitors 45, is the director and a video assist person. In addition to other production personnel, an assistant is also present on the set environment 10 to prepare and operate the production slate that provides information regarding the scene/take to be commenced and serves a synchronizing function as further detailed hereinbelow.

The equipment identified above has typically been analog in design. Accordingly, playback, editing and other desired operations required significant wait times for queuing of analog video tapes to desired positions identified through review of separate notes kept by the video assist or other production personnel. As well, retrieval of past recordings (e.g., days earlier) typically involved going to another location to obtain the appropriate videotape which would still need to be loaded to a VTR and queued to a proper position before significant review could take place. Further, slack time, such as time between calling to roll cameras and calling for action, would remain on the videotape requiring references to notations regarding tape positions to forward beyond when queuing, and additional queuing time as well, unless significant effort were taken to prepare a tape with such time deleted.

While some digital equipment has been introduced into the production environment, such as digital editors, such equipment has heretofore been incapable of accepting multiple video inputs for digital conversion and storage simultaneously and/or has been impractical for full-scale use in a production environment. Thus, where digital editors have been utilized, one camera may be connected thereto and be directly digitizing the cameras video signal, while the remaining camera signals were still recorded to analog tape and would later be sequentially input to the digital editor for digitization and storage. As well, such digital editor systems have heretofore been unable to concurrently manage the myriad of information required in production and post-production activities.

Figure 2:
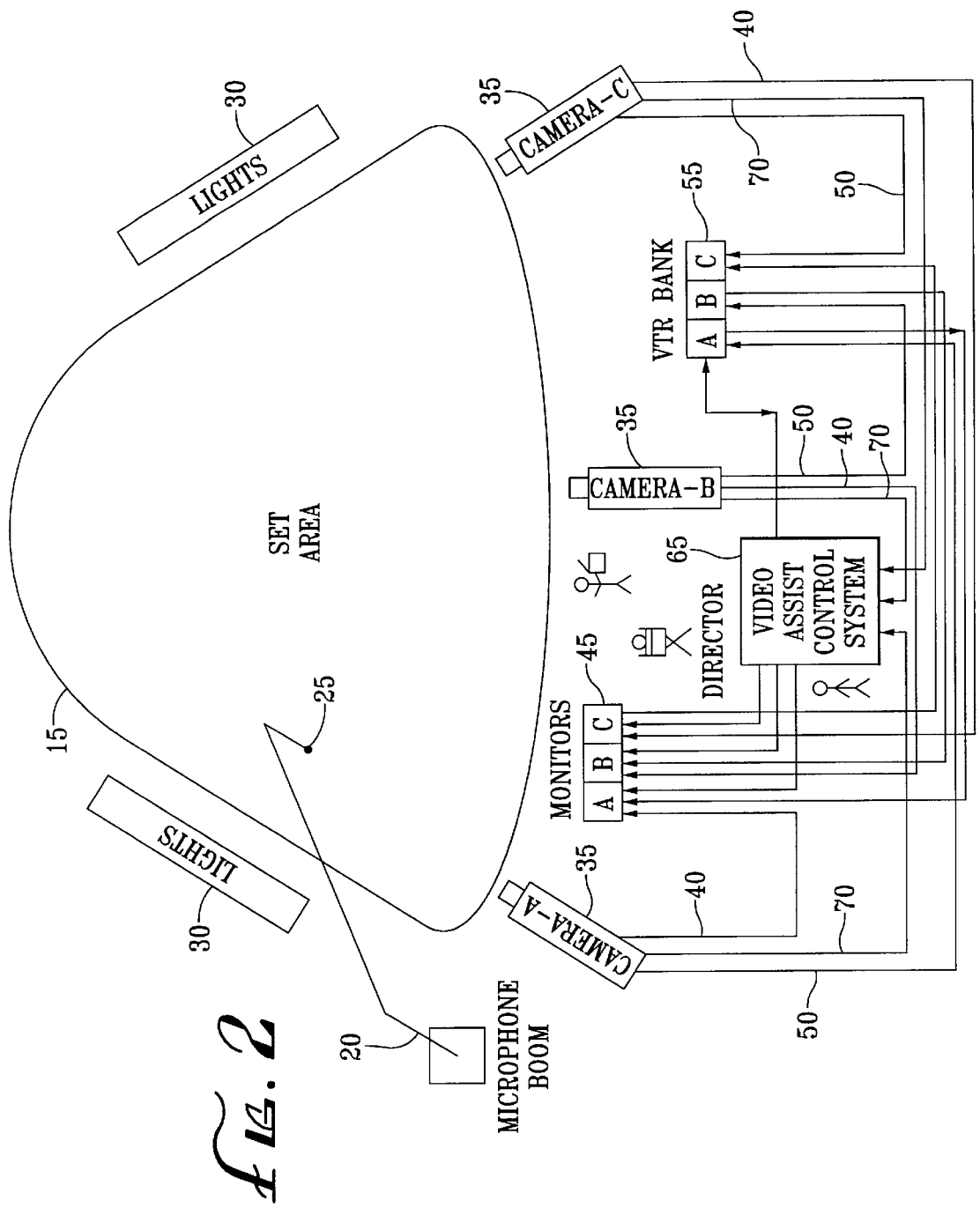
FIG. 2 is a simplified block diagram of an exemplary production environment incorporating a preferred embodiment of the present video assist systems and methods.

With reference to FIG. 2, a simplified diagram of a production environment 60 incorporating the present video assist control system and method is provided. As with the environment of FIG. 1, the FIG. 2 environment includes a set area 15, microphone boom 20, lighting 30, cameras 35, director, video assist person, video leads 40, 50, monitors 45, VTR's 55, and a slate operator. A preferred camera system is a film camera such as a Panavision® camera which includes both a film recording mechanism and a video camera output. The video output provides a "through the lens" view to provide the same image that is recorded on film. Alternatively, the camera 35 may be entirely video-based.

The environment 60 of FIG. 2 further provides a video assist control system 65 which, though shown as a single block in FIG. 2, may actually comprise various separate components as described, by way of example, below. The video assist control system 65 may be located at or near the production set area 15 (and preferably near the director), though it may readily be located more remotely to free space near the set area 15; in such instance, communication between the director and video assist or other operator may be accomplished through an intercom or other communication device. The video assist control system 65 is run by an operator, who may be the video assist person, an editor, the director, or other production personnel. Video signal connections 70 are made between each camera 35 (to receive the video signal output therefrom), each monitor 45 (to provide for playback of stored recordings from the video assist control system), and to each VTR 55 (to provide for importation of video into the system and export of video, typically after editing and assembling, out to videotape).

In a preferred embodiment, the present video assist control system 65 includes a storage module/server unit, which may, for example, be a Tektronix "Profile" model PDR-100 32 gigabyte, i.e., 8×4 gigabyte hard drive array, video/audio server (recorder/player), or other such unit capable of multi-channel digital video recording and playback. The server unit may be controlled by, e.g., a personal computer, such as a Pentium, Windows NT-based system which, in a preferred embodiment is a Dell laptop computer running custom software modules exemplified by the code selections incorporated in the appended microfiche. Connection between the control computer and the server unit is preferably accomplished via Ethernet connection. In addition, a preferred embodiment of the present video assist control system 65 utilizes a Videonics Video Tool Kit to assist with videotape control, Panasonic VTR's, Panasonic switchers for use, e.g., in conjunction with special effects recording, and a Videomedia V-LAN system for controlling tape decks, DDRs and switchers. While the above-identified components are used in conjunction with a preferred embodiment, it is noted that the various aspects of the present video assist control system are readily reconfigurable to accommodate components of different manufacturers and different design while still remaining within the scope and spirit of the present disclosure and claims. The system may also incorporate one or more direct control boxes, as will be described in further detail with respect to FIG. 17.

In the production environment 60 of FIG. 2, recording of a scene/take by all enabled cameras 35 occurs digitally within the video assist control system 65. It is noted that the overall environment 60 still may include VTR's 55 and, thus, may result in two recordings of the camera video signals, i.e., one by the VTR's 55 and one by the present video assist control system 65; in such instance, the analog recording may still be retained as a backup or for archival purposes. Recording and storing digitally by the video assist control system 65 advantageously allows for near instantaneous recall and playback of newly recorded information, and/or of previously stored recordings. In conjunction with a database functionality and various means for inputting markers and comment information (as will be detailed herein), the present video assist control system 65 further provides for instant access and editing at intermediate points within any of the stored recordings retained in the server. In a preferred embodiment, the user interface to the system is via a keyboard and mouse; however, any suitable input device(s) may be envisioned for use (and are included in the scope of the disclosure and claims herein where references to input devices may be made). For example, digitizing pens, touch screen interfaces, voice recognition interfaces and the like may readily be adapted to provide the highlighting, selection and/or entry functions as will be detailed herein.

In a preferred embodiment, the present video assist control system 65 is capable of simultaneously, selectively and digitally recording video input from up to four cameras (though more or less cameras could be utilized).

Figure 3:
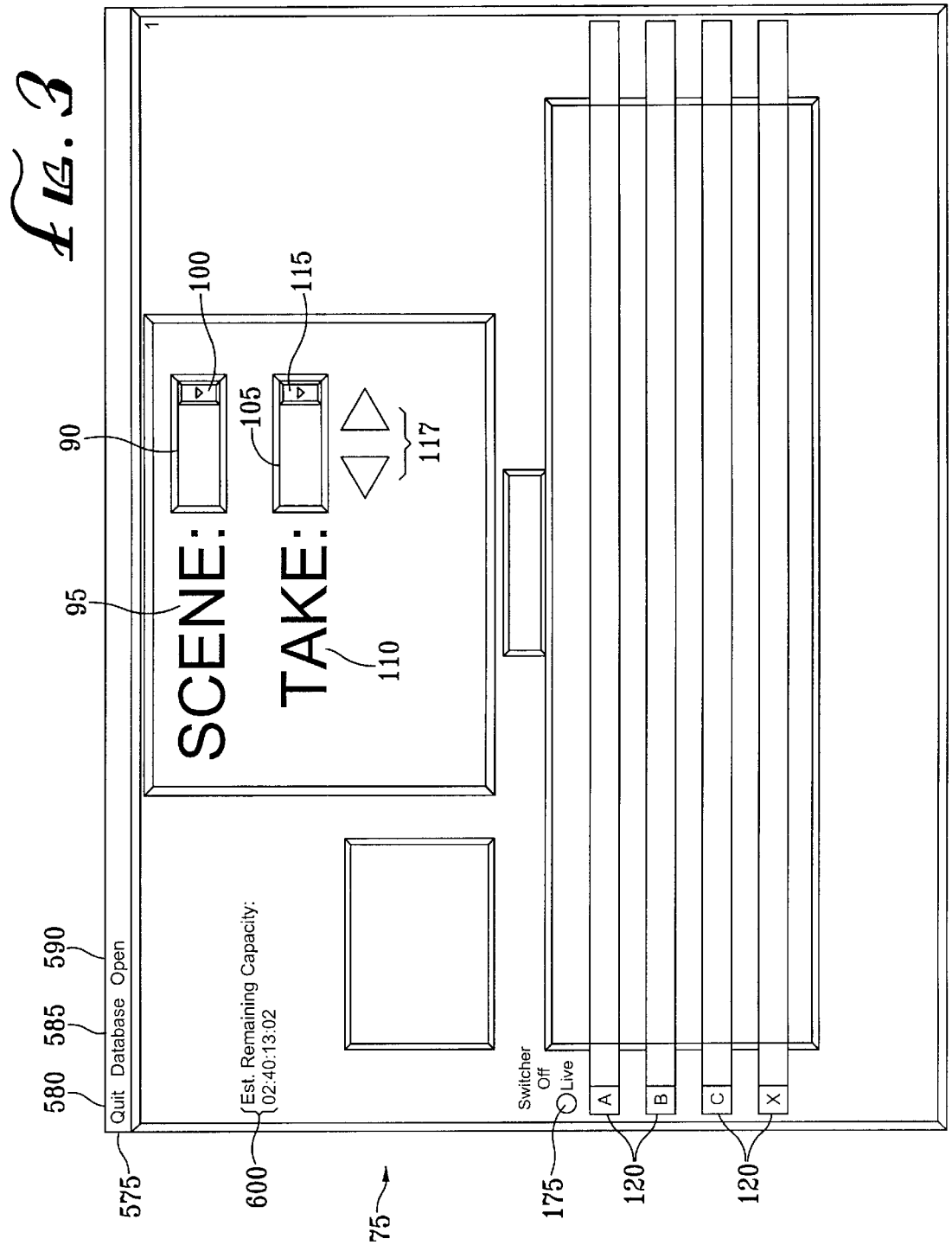
FIG. 3 depicts an exemplary "Scene Set-up Screen" according to a preferred embodiment herein.
Figure 4:
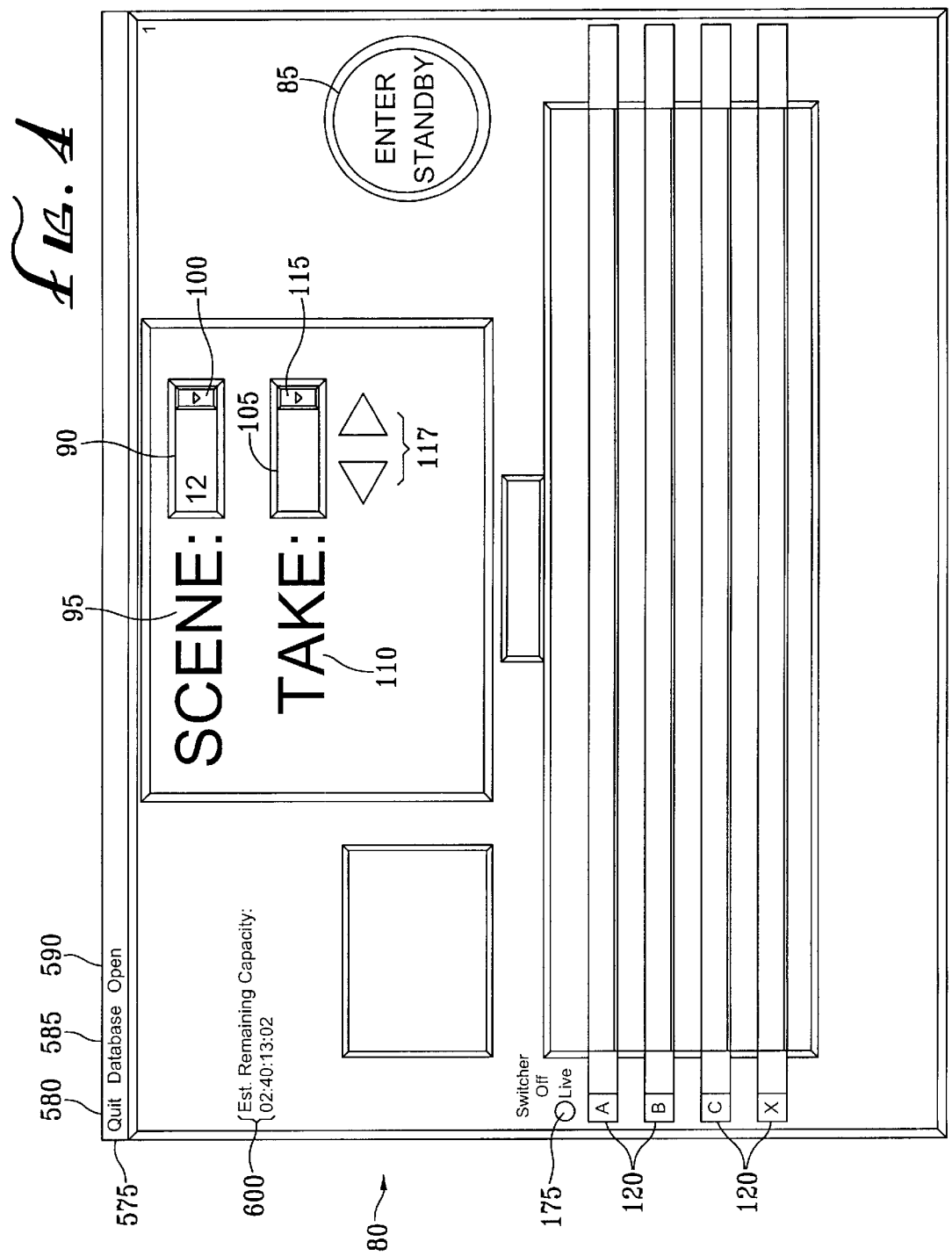
FIG. 4 depicts another exemplary "Scene Set-up Screen" according to a preferred embodiment herein.

FIG. 3 illustrates an exemplary "Scene Set-up Screen" 75 as may be initially presented at the start of a new production (wherein the database is empty) according to a preferred embodiment herein. FIG. 4 illustrates another exemplary "Scene Set-up Screen" 80 including an "ENTER STANDBY" selector 85 as may be presented when setting up a new scene for an existing production for which a database has been previously established according to a preferred embodiment herein. Utilizing the "Scene Set-up Screen" 75, 80, the system operator (which may be the video assist artist, director or other user) may enter or select identifying production information for the subsequent video to be operated upon (e.g., a scene name and/or a subsequent take to be filmed), and may identify which one or more video signals 70 from the multiple cameras 35 will be input to the system. Such information may be similar to scene, take and other information known to those skilled in the art of motion picture and/or television production and which heretofore has been recorded "manually", e.g., into notebooks, by video assist personnel according to known methods and conventions. The system of the preferred embodiment stores such information entered, and additional information entered and/or selected as identified hereinbelow, into a database wherein it is associated with a particular set of video recordings (e.g., from various cameras rolling during the take). In this manner, the present systems and methods advantageously provide for more timely retrieval of past recordings—using database search techniques as will be explained hereinbelow—than has heretofore been possible. Thus, the post-production review, editing, sequencing, and assembling processes are greatly enhanced, and the time required to go from production to final product may be significantly reduced.

Using a suitable input device(s), e.g., a mouse and keyboard according to a preferred embodiment, the operator highlights the scene box 90 and enters a scene name which may comprise any numeric, alpha, or alphanumeric combination, and which is preferably determined according to conventional film industry standards. In a preferred embodiment, the operator may alternatively select the word "Scene" 95 to open a dialogue box for entry of scene name or the operator may select a scene name from a pull-down menu (such as by selecting the down arrow 100 in the scene name box 90) in cases where a previously named scene is to be utilized (e.g., when filming another take for a previous scene). In a similar manner, the operator may enter a take name (which, again, would typically comprise a numeric or other designation according to industry conventions) through either the take box 105, selection of the word "Take" 110 or by selecting a take name from a pull-down menu 115. As a further alternative, the operator may select either the left arrow or right arrow graphic 117 below the take box 105 to scroll through consecutive takes, e.g., previous or next, respectively, until the desired scene and take is identified.

The operator may also utilize the "Scene Set-up Screen" 75, 80 to set the operating mode of each of the four cameras 35 connectable in the preferred embodiment. It is noted that the preferred embodiment is directed to up to four cameras 35 being simultaneously operated when filming a particular scene/take. However, the system may readily be modified to accommodate more or less cameras 35 and, in fact, would typically be expected to operate most often with two cameras enabled simultaneously according to present industry practices. It is further noted that the four cameras 35 of a preferred embodiment are identified within the system by the camera designators 120 A, B, C, and X on the screens of FIGS. 3 and 4—and similarly throughout various other screens exemplified in further Figures herein. As used in this specification, the camera designators 120 A, B, C, and X may alternatively be used to reference channels corresponding to the video signals received from the cameras 35 or corresponding to video signals to be played back.

Returning to setting of camera 35 operating modes, the operator's selection of any camera/channel designator 120 on the "Scene Set-up Screen" 75, 80 effects the display of a mode menu from which the desired mode for the corresponding camera 35 may be selected. According to a preferred embodiment, the mode choices include: an "off" mode, wherein the input, if any, from the corresponding camera 35 is disabled; a "record" mode, wherein the input from the corresponding camera 35 will be recorded; or, an "import" mode, wherein the input from the corresponding camera 35, if any, will be disabled in favor of playback of a previously recorded video segment on the corresponding channel for that camera 35. This latter mode may be useful, for example, when a "blue screen" take presently being filmed is to be superimposed onto a previously recorded background scene. In such instance, the system may further provide means for performing such superimposition for viewing on associated monitors 45 during playback after recording of the "blue screen" take. Further details regarding the "import" mode will be presented hereinbelow. It is noted that while the preferred embodiment provides for enablement of cameras/channels prior to recording, it is envisioned that one or more of the camera/channels may be set to automatically commence recording upon the start of filming by the associated camera with such operation being within the scope of the specification and claims herein.

Figure 5:
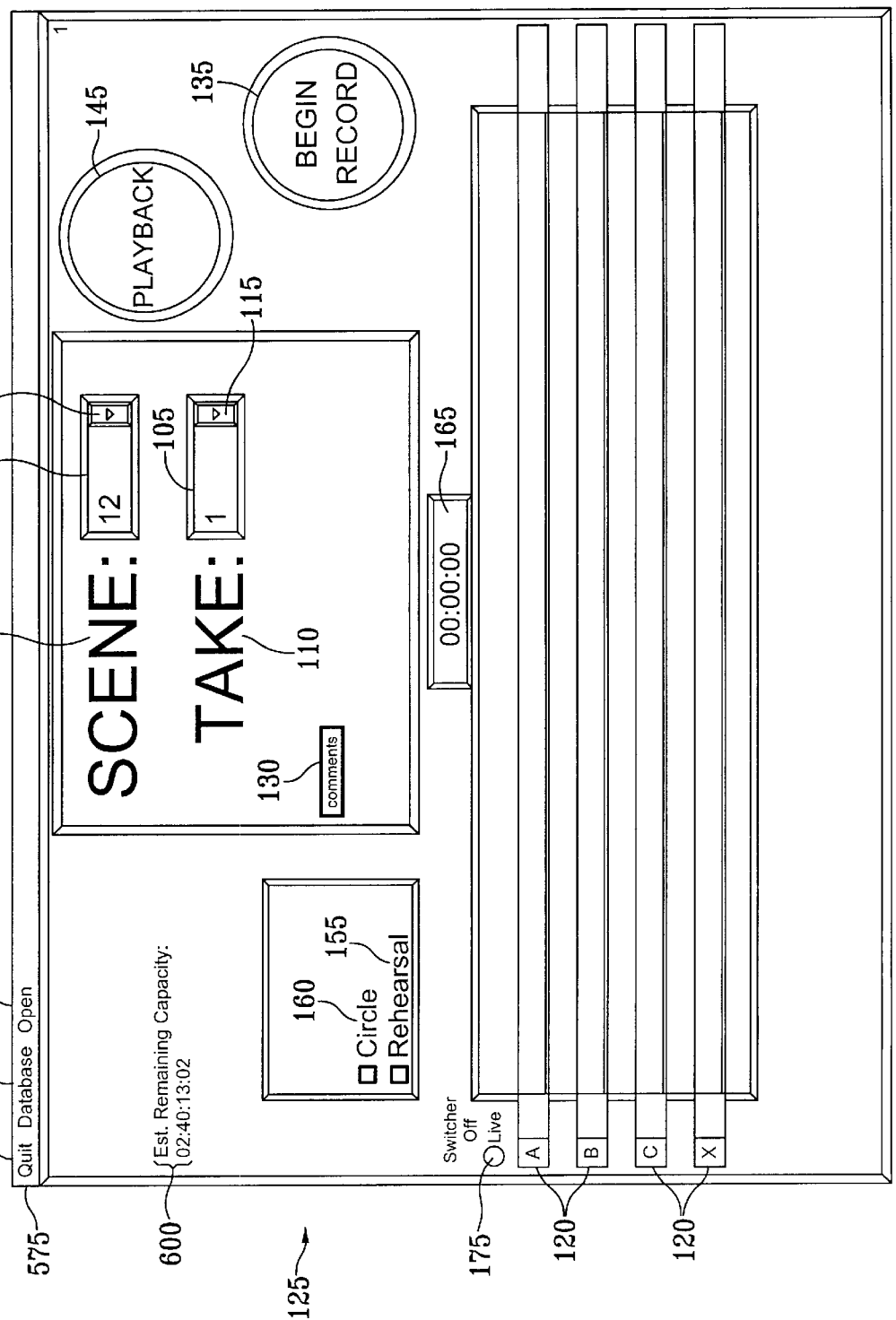
FIG. 5 depicts an exemplary "Record Ready Screen" according to a preferred embodiment herein.

With reference to FIG. 4, once the desired scene set-up is completed, the operator selects "ENTER STANDBY" 85 to display a "Record Ready Screen" 125 as exemplified in FIG. 5. Scene name, take name and camera mode information are automatically transferred from the "Scene Set-up Screen" 75, 80 to the "Record Ready Screen" 125. However, in like manner to that detailed above with respect to the "Scene Set-up Screen" 75, 80, the "Record Ready Screen" 125 provides the operator access to scene names, take names, and camera designators 120 in order to make changes to any of these settings prior to commencement of recording, or in order to select a previously recorded take for playback as provided hereinbelow.

Additionally, the operator may also enter comments (e.g., notes keyed in by the user) related to an overall scene (wherein the comment is associated with all takes within that scene), a particular take, a particular enabled camera 35, and/or a particular selection within a take. In a preferred embodiment, comments are inserted through operator selection of a "comments" designator 130 that results in the display of a scrollable popup notepad for comment entry—as illustrated in FIG. 5 (as well as FIGS. 6 through 10 and 11 through 14 in relation to other screens). Once entered, the system stores the comments, as with other system settings identified herein, in a database for retrieval with associated stored scene/take recordings, or for use as a means for later searching of the database of scene/take recordings.

Returning to FIG. 5, assuming an original take recording, or re-recording, is desired, the operator selects "BEGIN RECORD" 135 to commence recording and storage of the video input from all enabled cameras 35, as well as to commence time code recording as further detailed hereinbelow, and to commence concurrent video display on monitors 45 associated with the corresponding channels. Selection of "BEGIN RECORD" 135 further results in the display of the "Recording Screen" 140 as exemplified in FIG. 6. Alternatively, the operator may select "PLAYBACK" 145 from the "Record Ready Screen" 125 to display a "Playback Screen" 150 as alternatively exemplified in FIGS. 7, 8, 9 and 10 to be explained in further detail hereinbelow. The "Record Ready Screen" 125 further offers operator selections for "Rehearsal" 155, wherein the video from a non-filmed rehearsal may be recorded, stored in the database, and reviewed or edited just as a normal take may be, and for "Circle" 160, to be explained further hereinbelow.

Figure 6:
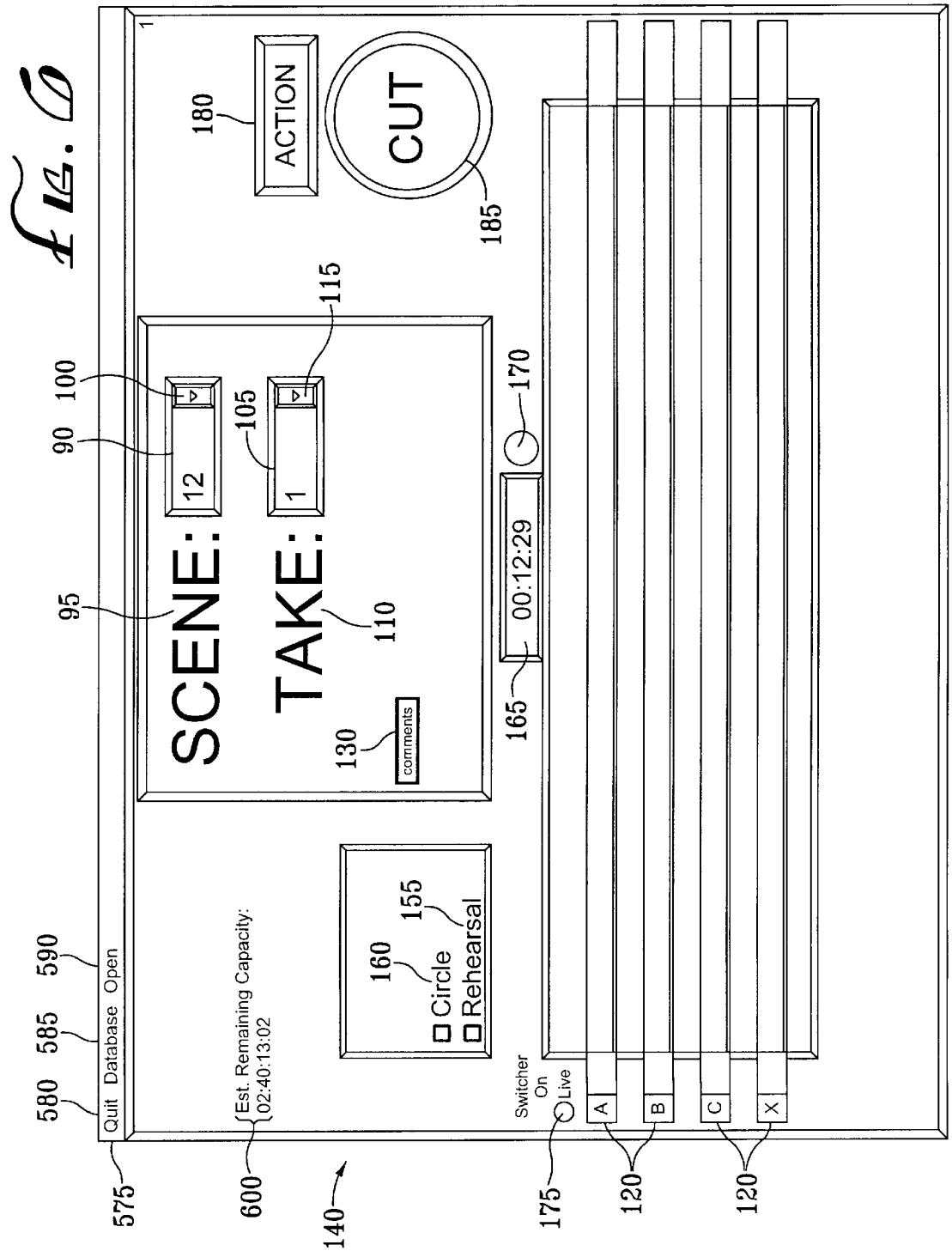
FIG. 6 depicts an exemplary "Recording Screen" according to a preferred embodiment herein.

With reference to FIG. 6, an exemplary "Recording Screen" 140 is illustrated. As before, the scene name and take name information are automatically transferred from the previous screen; respective camera mode selections are also utilized—with camera designators 120 (A, B, C, and/or X highlighted with respect to cameras 120 which are in any mode but "off"). As indicated previously, actual recording of video from selected cameras began from the selection of "BEGIN RECORD" 135 on the "Record Ready Screen" 125 and, thus, is occurring simultaneously as to each camera 35 which has been enabled for recording as this "Recording Screen" 140 is displayed. It is noted that the presently described preferred embodiment does not actually turn on the cameras 35 themselves (though alternatively it could), but, rather, enables the recording of video sent over a video feed line 70 from the respective camera (such as may be connected to a monitor 45 for concurrent viewing while filming). Preferably, selection of "BEGIN RECORD" 135 by the operator may occur coincident with instruction, typically from the director, to "roll cameras", i.e. begin filming.

As may be seen in FIGS. 5 through 14, a counter 165 displays time code information during recording and playback which may, for example, comprise minutes, seconds, and frames according to known industry conventions, but may alternatively and/or selectively utilize other measures. Various time code frame rates are supported including Longitudinal and/or Vertical Interval Code. The recording time code can come from a number of sources alternatively, e.g., the audio recorder, the film camera, an external generator, or an internal generator. Time code information is stored in the database in relation to corresponding recordings and may subsequently be used to create an edit decision list or telecine transfer list for reference to an original film negative, print or telecine transfer. A flashing red dot 170 located next to the counter provides a visual indicator that the system is recording. During playback (as will be further detailed hereinbelow), the system provides for toggling between displaying current position in terms of the take's overall duration or in terms of the actual recorded production time code. When a single channel is playing, its time code is displayed along with a label identifying which channel the time code corresponds to.

A "Live" indicator 175 identifies to the operator, when "lit", that the system is accepting input from the camera(s) 35 which have been enabled. In a preferred embodiment, monitors 45 are interconnected with the system to allow viewing of video being recorded; thus, the "Live" indicator 175 serves to identify that such video may be seen on these monitors 45 as well. It is noted that additional monitors 45 may be incorporated into the film environment 60 which are linked directly to the cameras 35 on set, and which may be dedicated to viewing of images through those respective cameras 35 to which they are linked; accordingly, during playback, the operator, director, and others may view both playback material as well as further live images from the cameras 35 on separate monitors 45. As will be further detailed with respect to the playback operation, this "Live" indicator 175 may also serve as a switch selector to allow toggling between playback and viewing of live video from the enabled camera(s) 35.

As is known to those skilled in the film/video production arts, an action command is issued, again typically by the director, once cameras 35 are rolling and everything is readied for the action, i.e., the sequence of events to be filmed, to begin. In environments where the present video assist control system 65 is not utilized, the spoken roll camera and action commands, and/or the slapping together of the production slate, may later be synchronized to the resulting film to identify the point at which desired filming began (which may, in some instances, represent a significant delay from the point at which cameras began rolling), and may be used to synchronize the separate audio and video recordings made during production. When reviewing takes for quality and/or acceptability, a director is primarily interested in only the action portion of a take that is filmed. In previous systems and methods, production personnel must manually identify the action points in order to allow review of the desired filming alone. In the case where playback is desired promptly after completing filming of a take, the corresponding videotapes must be manually queued up to the action point—while the director and others wait. In the case where a number of takes are to be compiled for review, e.g., a days worth of filming for review by the director or others, production personnel must manually identify the action points for each respective take and prepare an action-only compilation through re-recording of video to eliminate non-action portions, or, in the case of footage on film, through cutting and splicing of film strips once developed—both of which are time-consuming and expensive options.

A preferred embodiment herein addresses the above inefficiencies by providing an "ACTION" selection switch graphic 180 (as shown in FIG. 6) that may be selected by the system operator concurrently with the director's issuance of an action command. Upon selection of "ACTION" 180 by the system operator, the system "marks" the corresponding action starting point in the recording—such as by noting and storing position information relative to, e.g., the counter 165 information being maintained. As will be further detailed below, the system may preferably and instantaneously be set to queue up to the action point directly upon future playback of that take (either at the time of filming or for future purposes of recall and review, and/or for preparation of a review compilation tape). Optionally, the system may even provide for automatic or selective deletion of pre-action information in order to save system resources (e.g., disk storage space). As with the previous "Record Ready Screen" 125, the "Recording Screen" 140 allows the operator to mark a take, according to known industry conventions, as either a "circle" take 160, i.e., one which was filmed and immediately approved by the director, or a non-filmed "rehearsal" take 155, which may advantageously be recorded by the system for purposes of further film development or for critiquing of actors, actresses, production personnel, and/or set design.

Upon completion of recording for the selected take, the system operator may select "CUT" 185 (e.g., coincident with the director's like instruction) which stops system recording of video input from the camera(s) 35 which were enabled. According to a preferred embodiment, selection of "CUT" 185 may further result in the display of a "Playback Screen" 150, as alternately exemplified in FIGS. 7 and 8, and in the queuing of the respective digitized video for that take to the beginning of the recording (e.g., in the case where an action marker 190 was not set during recording—as exemplified in FIG. 7) or to the point where action began (in the case where and action marker 190 was set during recording—as exemplified in FIG. 8).

Figure 7:
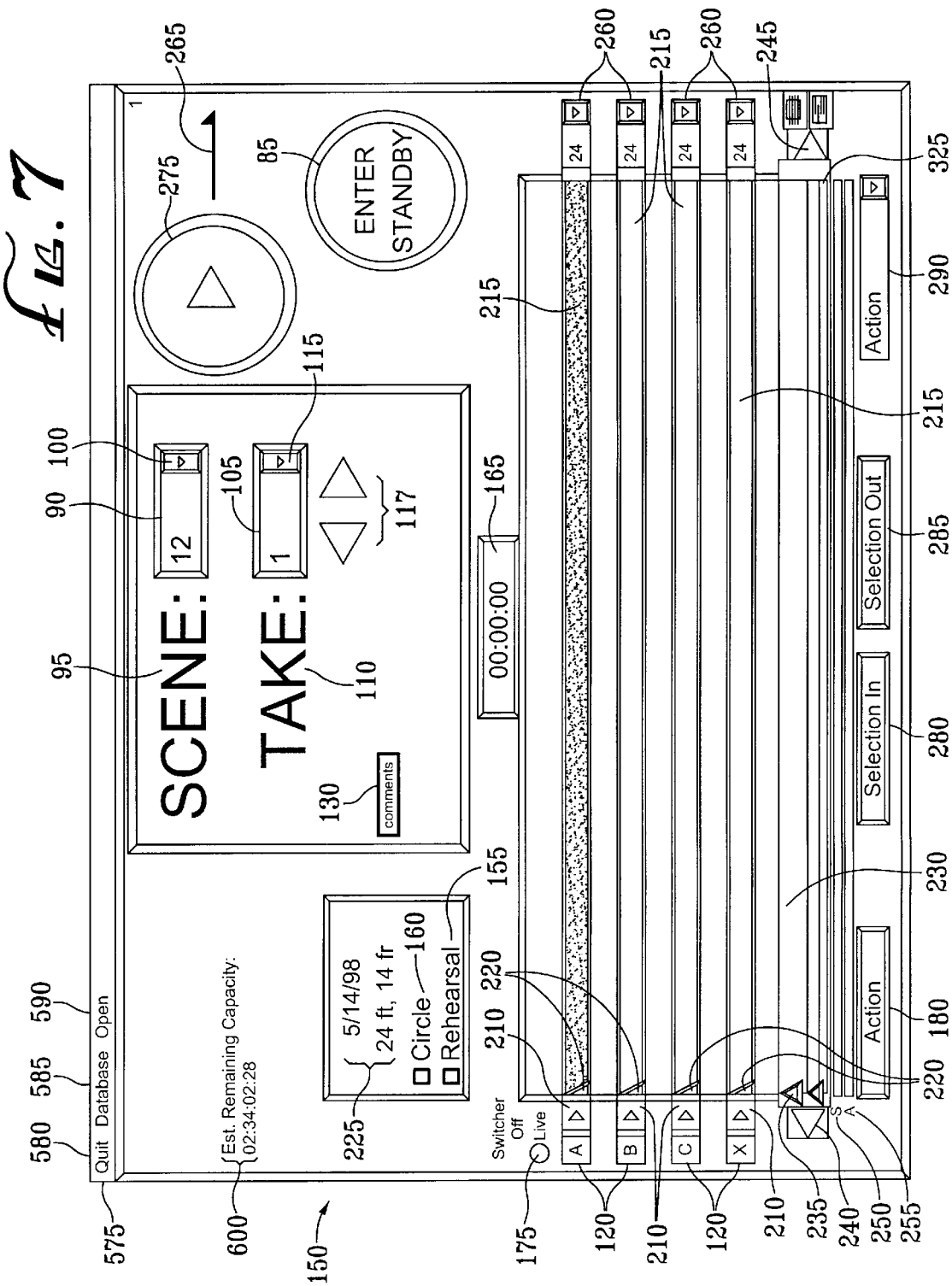
FIG. 7 depicts an exemplary "Playback Screen" according to a preferred embodiment herein.

With reference to FIG. 7, an exemplary "Playback Screen" 150 according to a preferred embodiment herein is illustrated. As with previously detailed screens, the scene name, take name and camera mode designations are transferred from the previous screen (e.g., in the case where the previous screen was the "Recording Screen" 180). Alternatively, the operator may enter, or utilizing the pull-down menus 110, 115 or left/right arrows 117 may select, a different previously recorded video (i.e., scene and/or take) for retrieval and playback. In this latter instance, the corresponding stored, digitized recording of the selected scene/take is near instantaneously accessed and queued, as described above, to the beginning of the recording or to the point where action began (depending, for example, upon whether or not an action marker 190 was previously set). As well, and as will be further detailed hereinbelow, with respect to stored scene/take recordings which may have previously been played back and edited, the scene/take may be automatically queued up to the beginning of a previously marked selection, e.g., an intermediate portion of the recording for which a beginning point 200 and endpoint 205 have been marked (as exemplified in FIG. 9).

Returning to FIG. 7, a "Playback Screen" 150 is depicted wherein the stored and digitized recording of scene 12, take 1 is readied for playback wherein no action marker 190 had been set during recording. Right arrows 210 next to the respective camera/channel designators 120 identify those channels as having associated recordings, e.g., as having been running and recorded by the system 65 during the selected scene/take (or, in relation to similar "Playback Screens" 150 as otherwise having been queued to play back previously recorded material—such as where "imported" material may be queued as provided hereinbelow) and provide a selection means to independently select or de-select playback of stored recordings from these particular cameras 35. A channel control bar 215 for each enabled channel 35 is provided to the right of the respective camera designators 120 according to a preferred embodiment The channel control bar 215 provides a visual means (via channel control sliders 220—represented as up arrows in FIG. 7—which move along the channel control bar 215 during playback) for assessing the status of playback in relation to the overall duration of each stored recording. The channel control sliders 220 may also be independently selected by the operator and dragged to a desired position along the channel control bar 215, thus resulting in forwarding (or backtracking) of the stored recording to a corresponding position.

As with previous screens, a counter 165 is provided—immediately above the channel control bar 215 section in a preferred embodiment—to assist in the identification and positioning process and to provide position information in a time code format known to those skilled in motion picture and/or television production arts. Above "Circle" 160 and "Rehearsal" 155 designators (which, as before, are present to indicate such selections previously made and/or to allow for their selection in conjunction with playback, review and/or editing), a production date and overall recording length display 225 provides such information for the scene/take, and is selectable to display in either feet and frames—as illustrated in FIGS. 7 through 10, 13, and 14—or minutes, seconds and frames (not shown) in a toggle manner.

Returning to FIG. 7 (and as also provided in the screens of FIGS. 8 through 14), a tracking control bar 230 is also provided below the channel control bar 215 section in a preferred embodiment to similarly provide tracking and control of all channels, e.g., in the case where simultaneous playback of all channels at once is desired. As with the channel control bars 215, the tracking control bar 230 also incorporates a tracking control slider 235 which automatically tracks playback of the selected channels, or which may itself be selected and dragged (forward or backward) to provide fast access to particular positions within the enabled channel recordings. During such fast access, the actual stored images may advantageously be viewed on a monitor 45 to assist in locating a desired position(s) in the recordings. Jumping to the beginning or end of the recording may be instantaneously realized by selection of the left arrow 240 or right arrow 245, respectively, located to the corresponding sides of the tracking control bar 230. As alternative means for accessing the queued recordings, the operator may jog frame-by-frame via the arrow keys on the system keyboard or, as will be further detailed in relation to the Direct Control Box 605 as illustrated in FIG. 17, the operator may utilize the jog/shuttle knob 635 to move through the frames in either a forward or reverse direction. As will be further explained with reference to FIGS. 8 and 9, a Selection (S) status line 250 and Action (A) status line 255 are also provided to indicate the status and relative position of corresponding marked selection 195 and action markers 190 for the scene/take identified.

Pull-down menus 260 to the right of the channel control bar 215 section in a preferred embodiment allow entry and/or selection of the playback speed to be associated with each respective channel. In accordance with known film industry conventions, the system 65 provides for playback in frames per second (fps) such as would be associated with traditional film media. In this regards, the nominal rate of the preferred embodiment is 24 fps (as seen in FIG. 7); however, differing frame rates may be entered to increase or decrease the playback speed (e.g., 48 fps would result in playback at ½ speed and 12 fps would result in playback at two times the normal speed).

A preferred embodiment further provides for optional one-time playback (wherein the playback of a scene/take, or a selection therefrom, is performed once from beginning to end with playback stopping upon completion) or for loop playback (wherein playback of a scene/take, or a selection therefrom, may be continuously repeated). Such choice is operator selectable in the preferred embodiment by toggling (e.g., by clicking with a mouse, pointer, or other device on the graphic) between a straight arrow 265 (as shown in the upper right corners of FIGS. 7 and 8) and a circular arrow 270 (as shown in the upper right corners of FIGS. 9 and 10).

Figure 8:
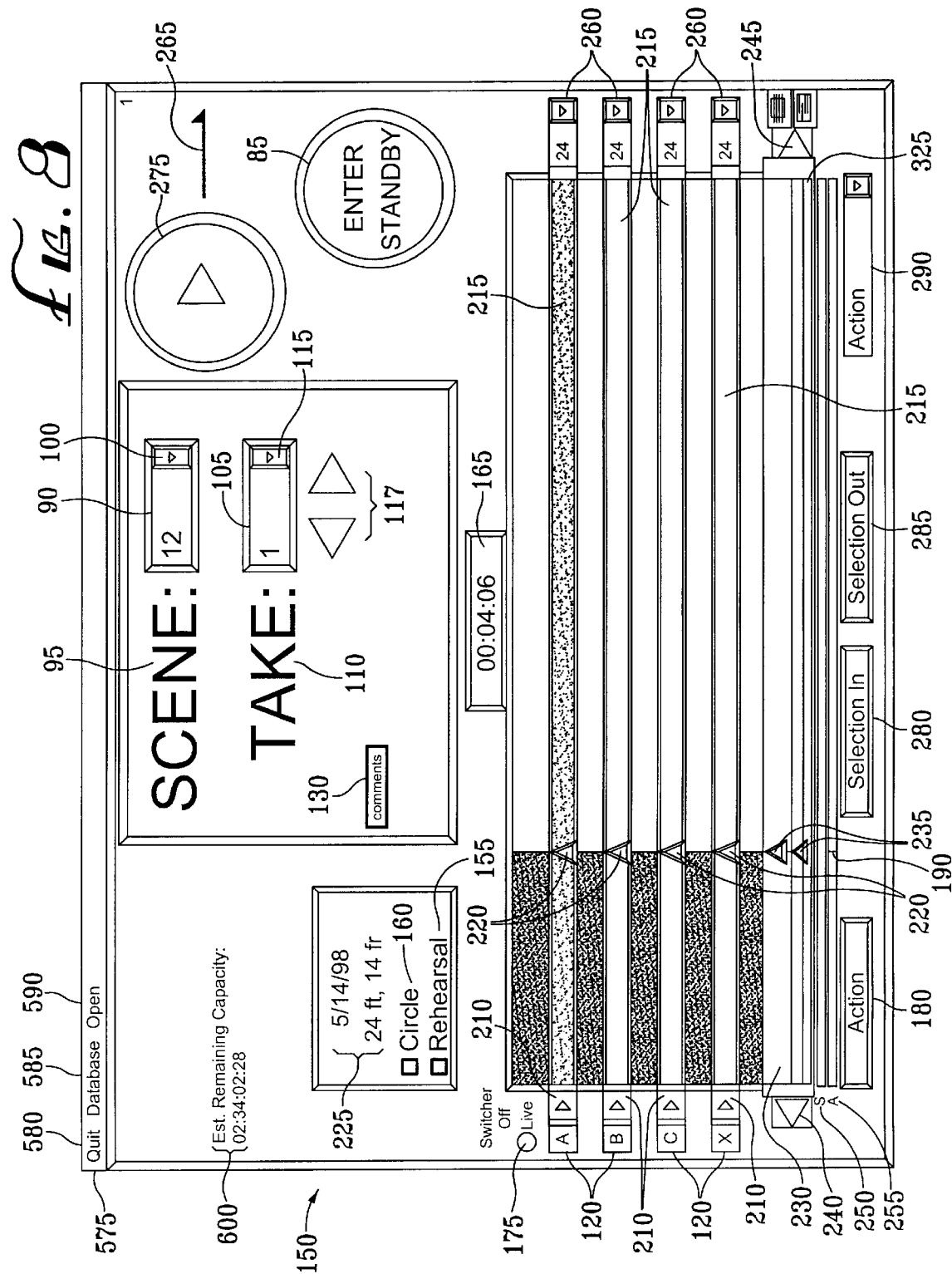
FIG. 8 depicts another exemplary "Playback Screen" according to a preferred embodiment herein.

Actual playback of the desired stored recording is initiated through operator selection of the play button graphic 275 on the "Playback Screen" 150 (as illustrated in FIGS. 7 and 8). Such selection results in toggling of the play button graphic to a stop button graphic 275 (i.e., square within a circular "button"). If, during playback, it is desired to switch to viewing of live images from the cameras 35, the "Live" designator 175 may be selected to result in pausing of playback and switching of system monitors 45 to viewing of enabled cameras 35.

As indicated previously, FIG. 7 illustrates a "Playback Screen" 150 with respect to a stored recording for which no action marker 190 was previously set. Should it be desirable to insert an action marker 190 (e.g., as a result of its wrongful omission during recording), or should an action marker 190 have been improperly positioned during recording, thus rendering it desirable to relocate the action marker 190, a preferred embodiment provides means to do so in conjunction with the "Playback Screen" 150. In this regard, once the proper position is identified in the stored recording—either through normal playback to such position or through movement of the channel control sliders 220 or tracking control sliders 235 to such position—the operator may then select the "ACTION" graphic 180 in the screen's 150 lower left corner, according to a preferred embodiment, in order to effect insertion of an action marker 190 at such point.

With reference to FIG. 8, an alternate view of a "Playback Screen" 150 is provided wherein an action marker 190 had previously been recorded with respect to the stored scene/take (either during its recording, or subsequently upon a prior playback and edit of the recording). An action status line (A) 255 provides a visual indicator that such an action marker 190 has been inserted and further indicates the relative position of the action marker 190 in relation to the entire stored scene/take recording. The system 65 may advantageously be set (e.g., through system default settings or, as explained further below, through menu selection) to automatically and instantaneously queue the stored recording to the start of action (i.e., the position of the action marker 190) upon entry into the "Playback Screen" 150. Under such circumstances, both the channel control sliders 220 and the tracking control slider 235 are positioned at the action marker 190 point indicating queuing of the recording to this point for start of playback (as is illustrated in FIG. 8). Queuing of the playback to such an action marker 190 position provides for improved review and edit times over known methods as a result of eliminating the need to forward through stored pre-action information which may often be significant in duration, yet is often of little or no real interest to the project.

Figure 9:
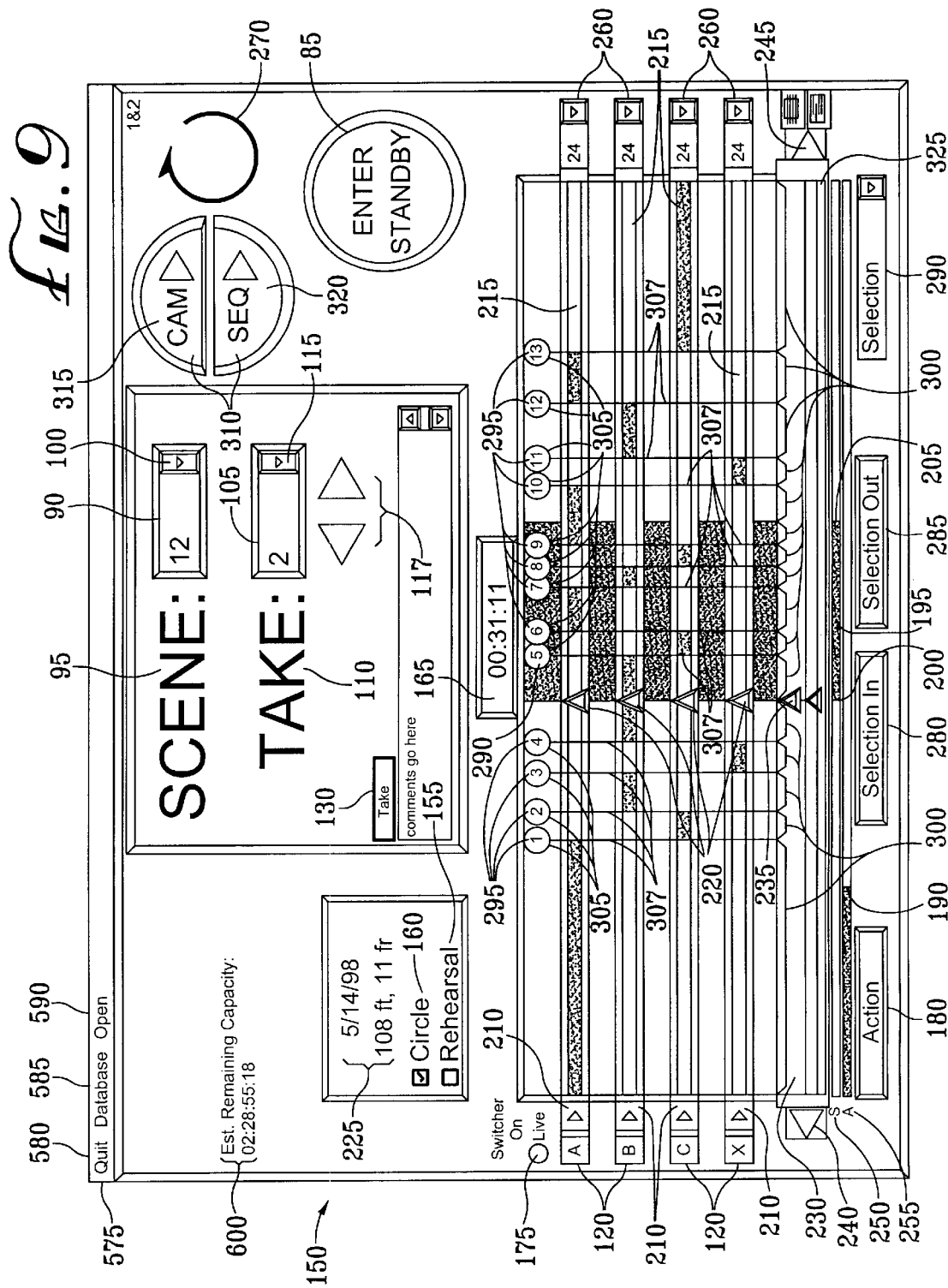
FIG. 9 depicts yet another exemplary "Playback Screen" according to a preferred embodiment herein.

Similarly to post-recording insertion of action markers 190, marking of a selection 195 (as illustrated in FIG. 9) for subsequent review may be accomplished in one of two ways according to a preferred embodiment. During normal playback viewing "SELECTION IN" 280 may be selected by the operator upon reaching the desired starting point 200 for the selection; thus resulting in a marker being stored in the system database which identifies that point as the start of a selection for that stored scene/take. Similarly, upon reaching the desired end point 205 of the selection, the operator may select "SELECTION OUT" 285 to insert (and store) a marker for that position. Alternatively, the operator may select the tracking control slider 235 in the tracking control bar 230 to proceed directly to a desired position. Once a desired position is reached using the tracking control slider 235, the operator may then, as above, select either "SELECTION IN" 280 or "SELECTION OUT" 285 accordingly. It may also be envisioned that selections for each channel, i.e., each camera 35 for which a recorded image was stored, may be made. To this end, the operator may use the respective channel control slider 220 to identify a beginning 200 and end point 205 with respect to that channel and, as above, select either "SELECTION IN" 280 or "SELECTION OUT" 285 accordingly. That a selection has been marked may be visually observed from the selection status line (S) 250, and alternatively may be indicated by varying background shading or coloring in the channel control bar 215 section, indicating the presence, including the relative start 200 and end point 205, of a selection 195.

As indicated previously, the system 65 may include default settings which instruct that queuing of the stored scene/take recording be made to a predetermined position at the "Playback Screen" 150 stage. For example, the system 65 default may provide for hierarchical queuing wherein the stored recording is automatically queued to the start 200 of a selection 195 if one has been marked, otherwise to the start of action if an action marker 190 has been identified, and yet otherwise to the beginning of the recording. Alternatively, or as a means of bypassing the default settings, a pull-down queuing menu 290 is provided in the lower right of the "Playback Screen" 150 according to a preferred embodiment. Such pull-down queuing menu 290 may preferably provide for selection between "Action" as indicated in FIGS. 7 and 8, "Selection" as indicated in FIG. 9, or "All" (not shown), whereby queuing of the recording to the respective position would automatically be effected in accordance with operator selection. Again, the tracking control sliders 235 and channel control sliders 220 are positioned at the starting queue position, thus providing visual reference with respect to the starting playback point in relation to the entire scene/take recording.

As is known to those skilled in the art of motion picture and/or television production, multiple cameras 35 are used to desirably obtain different camera angles, simultaneously, from which the best views for each particular action point in the scene may later be selected. With further reference to FIG. 9, an exemplary editing process whereby the various stored enabled camera 35 recordings for a given scene/take may be segmented, an edit sequence may be prepared wherein the desired camera 35—and thus viewing angle—for any particular segment is defined, and the resulting edit sequence may be played back for review is described as follows with respect to a preferred embodiment.

In a first step, cut points (or quick cuts) 295 are identified which will ultimately serve to define segments 300 within the stored recordings. Identified cut points 295 are displayed on the "Playback Screen" 150 as numbered identifier graphics 305 (1 through 13 in FIG. 9) over the camera/channel control bars 215. Each cut point 295 identifier graphic 305 has a center drop line 307 extending vertically downward to dissect each channel control bar 215—thus providing additional means to visually identify segments 300 and to aid in the selection process, explained below, for defining the desired "active" camera 35 for each segment 300. Actual insertion of a cut point 295 is effected by pressing the space bar on the system keyboard at the desired insertion point—which may be reached either in the course of normal playback of all channels or through fast position access via use of the tracking control slider 235. It is noted that while a preferred embodiment uses the space bar as a means for inserting cut points 295, other keys or means, including a selectable screen graphic (or a corresponding key on the Direct Control Box 605), may alternatively be utilized consistently herein.

Segments 300, in turn, are automatically defined as cut points 295 are inserted. For example, insertion of the first cut point 295 defines a first segment bounded by the beginning of the recording (or, more typically, the beginning of action as set with an action marker 190) and the first cut point 295 itself. Additional segments 300 are defined contiguously as each new cut point 295 is inserted. The final segment 300 is defined once the last cut point 295 has been entered (number 13 in FIG. 9) and is bounded by the last cut point 295 as the segment 300 starting point and the end of the recording as the segment 300 ending point.

Once segments 300 have been defined with respect to a particular scene/take, selection of the enabled channel recording to be considered "active" in each segment 300 may take place. In a preferred embodiment, default settings are actually utilized to sequentially define the active channel for each segment 300. For example, a default may be established where the first active channel in the first segment 300 is "A", followed by the second active channel in the second segment 300 being "B", the third "C", the fourth "X", the fifth "A", and so on. Any such default definitions may be changed within a segment 300 by selecting (e.g., clicking with a mouse) the channel control bar 215 portion for the desired channel to be "active" in that segment 300. Which channel is "active" within any particular segment 300 is visually displayed on the "Playback Screen" 150 through use of different colors or shades for the channel control bar 215 segments representing the "active" channel. Thus, as illustrated in FIG. 9, Camera A is active up to the first cut point 295, Camera C from the first to the second cut point 295, Camera B from the second to third cut point 295, and so on. Should a segment 300 related to a particular channel be selected in error, the preferred embodiment provides for deselection of that channel segment 300 by clicking on it again while holding the control key on the system 65 keyboard.

Figure 10:
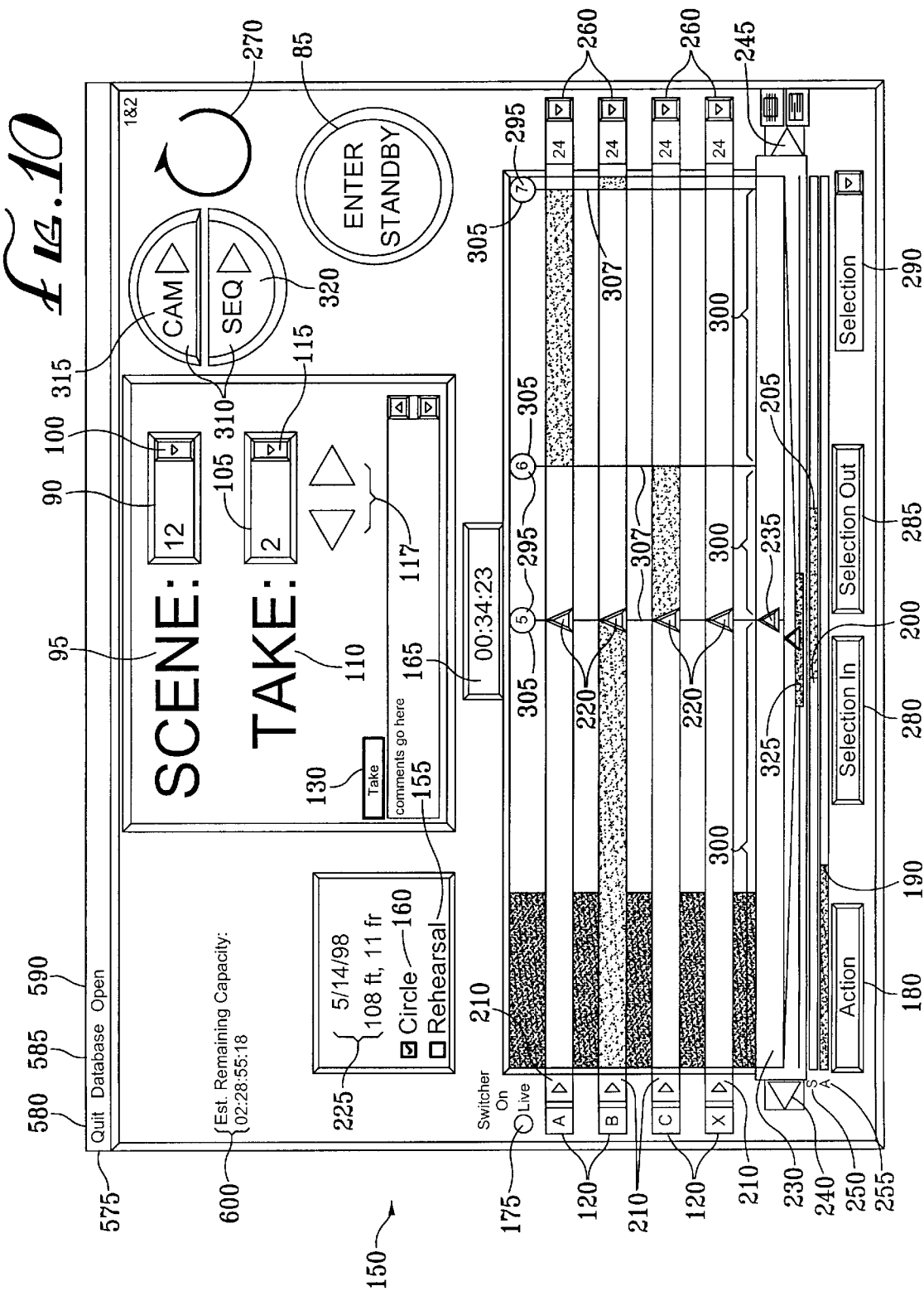
FIG. 10 depicts yet another exemplary "Playback Screen" according to a preferred embodiment herein.

Completion of the above cut point 295 insertion, segmenting 300, and "active" channel definition editing processes results in the definition of a possible scene/take sequence comprising the contiguous "active" channel recordings for each segment 300. As it is desirable to be able to review such a sequence for proper quality and effect, a preferred embodiment advantageously provides a modified playback button graphic 310 on the "Playback Screen" 150 (as depicted in FIGS. 9 and 10) such that it may optionally provide for selection between normal playback of all recorded channels—as previously described—by selecting the upper "CAM" half 315 of the modified playback button graphic 310, or for playback of the possible scene/take sequence only by selecting the lower "SEQ" half 320 of the modified playback button graphic 310. Should it be desired to change the position of any cut points 295 once set, the preferred embodiment provides such capability by utilizing a point and drag method wherein the cut point 295 to be moved is selected and moved forward or back (e.g., by pointing at the cut point 295 graphic then clicking the mouse and moving while holding down the mouse button). Moving a cut point 295 in such a manner automatically results in adjustment of the segment 300 lengths on either side of the cut point 295 that is moved.

When a long take is recorded, every single frame may not be addressable from the limited number of pixels spanning the tracking control bar 235. Accordingly, a preferred embodiment further provides a zoom bar graphic 325 (as illustrated in FIG. 9) which may be selected (such as by clicking thereon) to display the tracks at a one pixel per frame resolution (alternatively, it is envisioned that variable scaling may be implemented to provide operator selection of the zoom resolution). Once selected, the zoom bar graphic 325 adjusts (as illustrated in FIG. 10) to visually represent the duration of the zoomed in view in relation to the overall take duration as illustrated by the tracking control bar 235. In such manner, cut points 295 may be more accurately set to desired frames in the take. As well, it is possible to scroll through the take using the tracking control bar 235 when zoomed in.

Once playback, review, editing, and sequencing are completed for a particular scene/take, or should it be desired to suspend review, editing, etc., e.g., to begin recording with respect to a new scene, the operator may select "ENTER STANDBY" 85 on the "Playback Screen" 150—thus ending playback, if ongoing, and displaying the "Record Ready Screen" 125 as exemplified in FIG. 5.

With reference to FIGS. 11 through 14, and as indicated previously, a preferred embodiment herein further provides for the importation of pre-existing material into a channel for use in conjunction with new take recordings (e.g., with respect to special effects such as where a blue screen take is to be recorded and used in conjunction with pre-existing background material). In particular, the preferred embodiment provides the capability of creating a composite image of a live take being recorded superimposed with the pre-existing material. The composite image may be viewed (e.g., on a separate monitor 45 for viewing the composite video) during recording of the live take. Such pre-existing material may be either a previously recorded take track or it may be material that was introduced from a different source (e.g., computer-generated animation, etc.).

Figure 11:
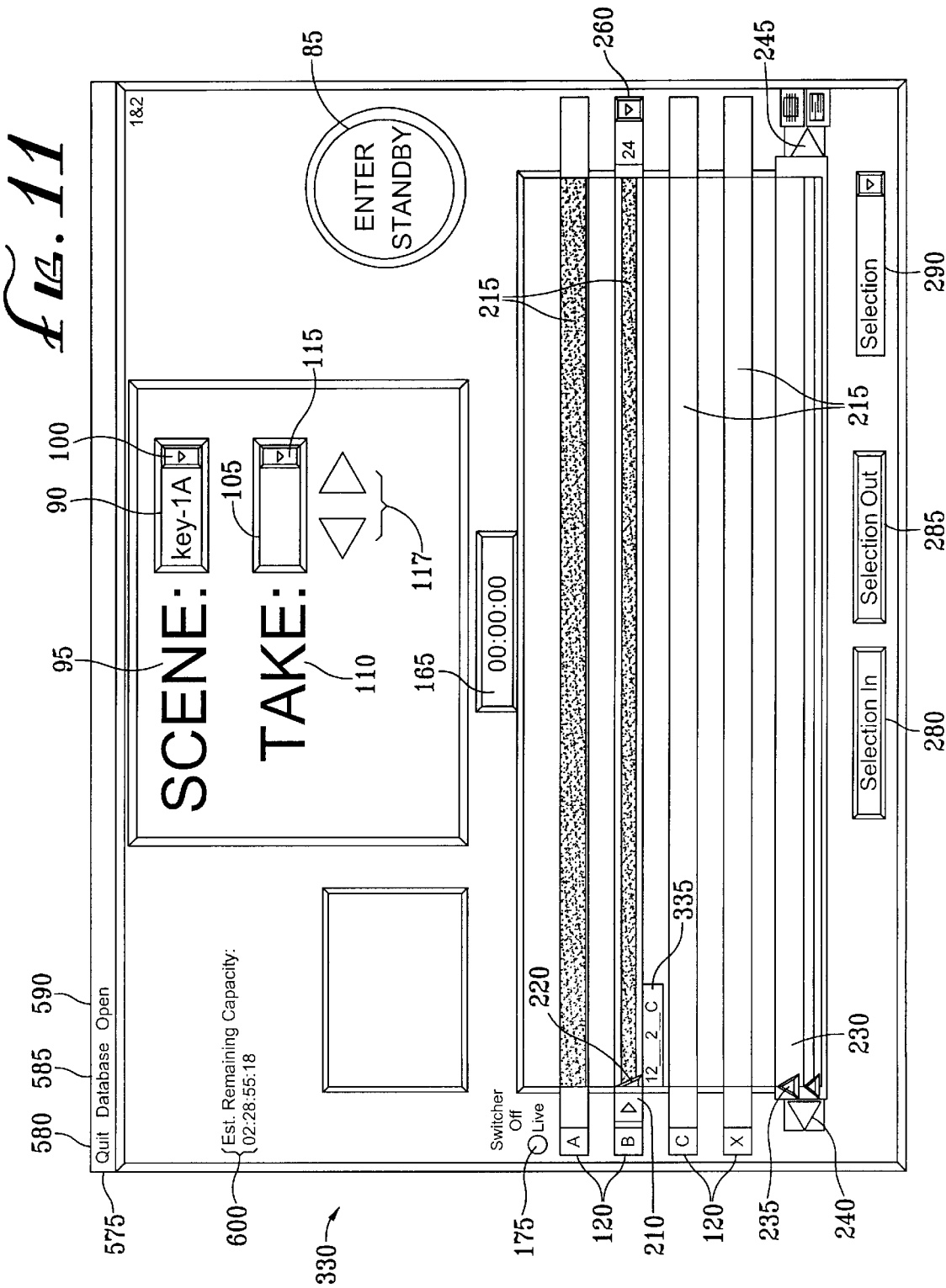
FIG. 11 depicts an exemplary "Record Ready with Import Screen" according to a preferred embodiment herein.

With reference to FIG. 11 (illustrating a "Scene Set-up Screen" 330 as may be provided for use in conjunction with importing of preexisting material), compositing is accomplished in a preferred embodiment by importing the pre-existing material into a channel that is not to be used for recording new live take material (as shown in FIG. 11, Channel/Camera A is set to record the live take material while the preexisting material has been imported to Channel B). Upon importation, the database name of the pre-existing material 335 (e.g., scene/take name or other identifier) is shown beneath the corresponding channel control bar 215.

Figure 12:
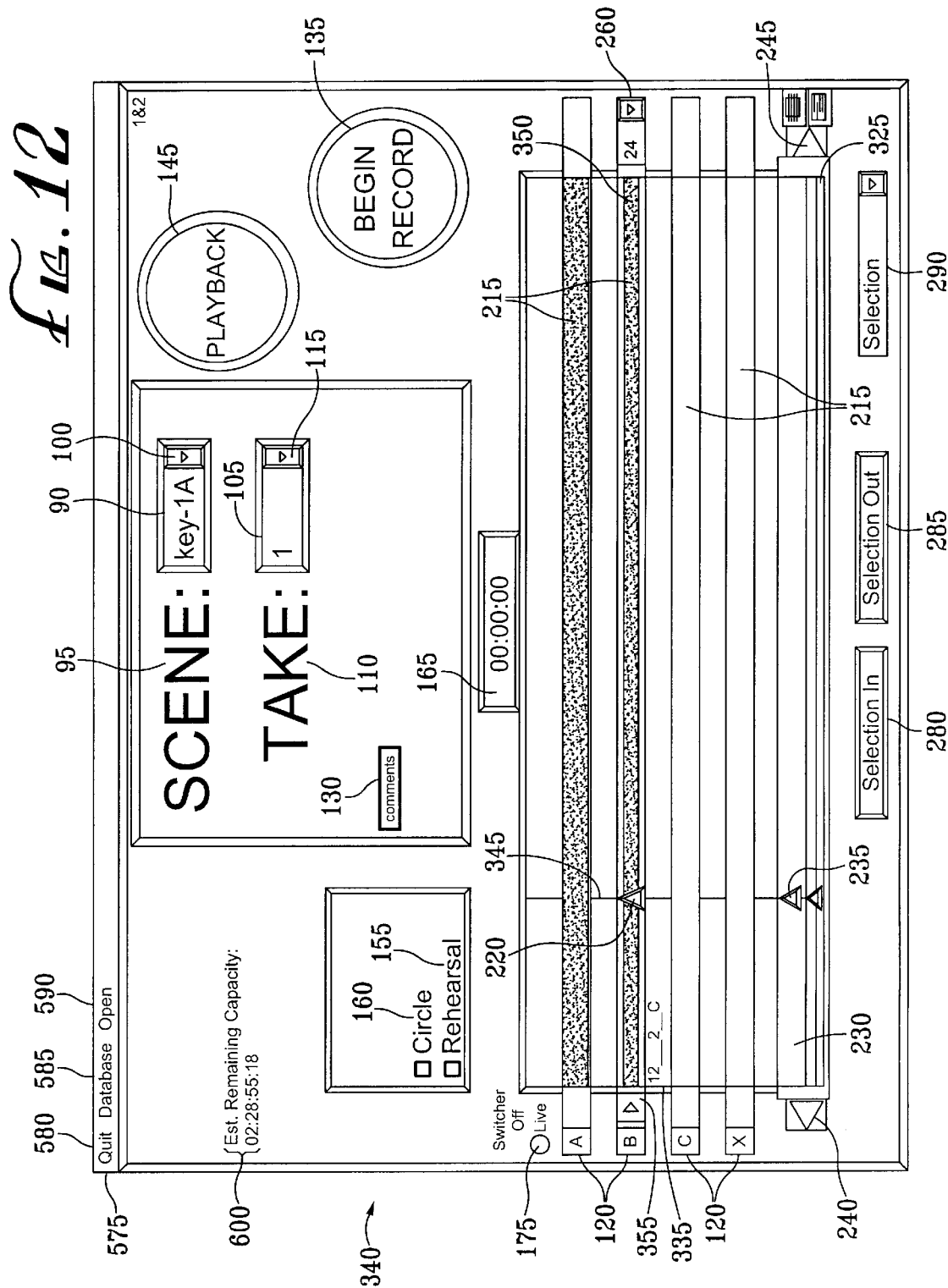
FIG. 12 depicts an exemplary "Recording with Import Screen" according to a preferred embodiment herein.
Figure 13:
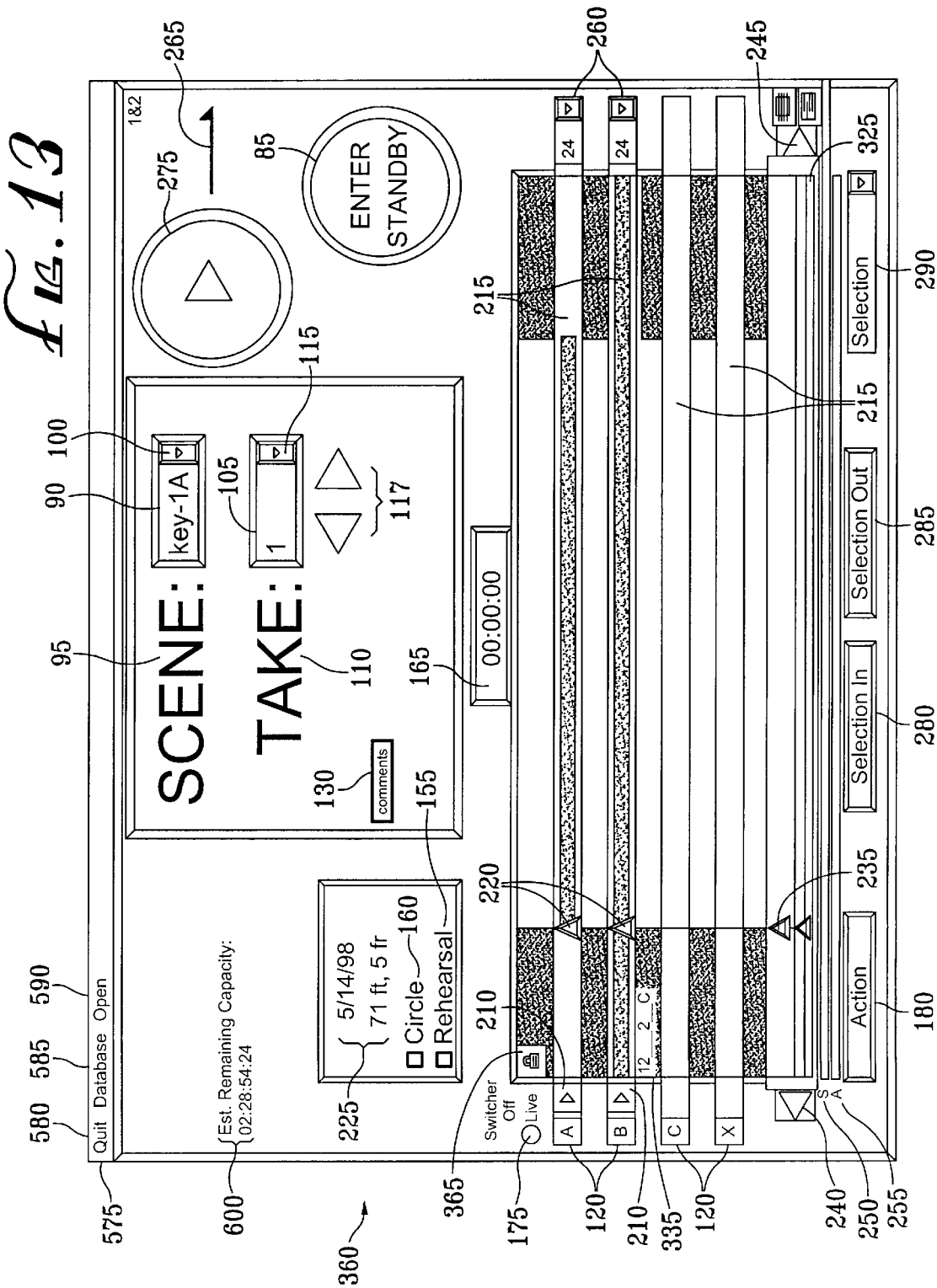
FIG. 13 depicts an exemplary "Playback with Import Screen" according to a preferred embodiment herein.
Figure 14:
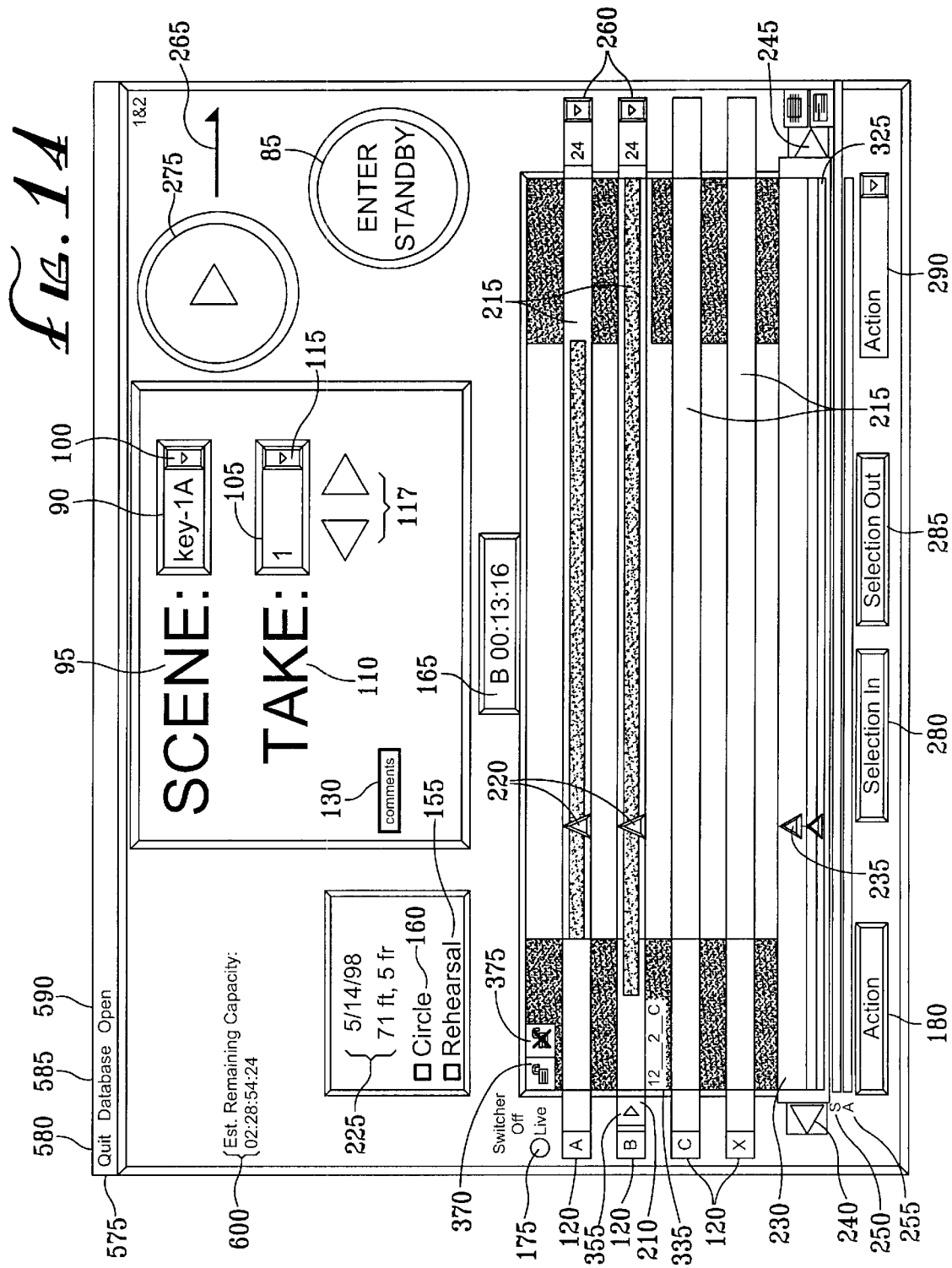
FIG. 14 depicts another exemplary "Playback with Import Screen" according to a preferred embodiment herein.

With reference to FIG. 12, a "Record Ready Screen" 340 is illustrated as may be provided for use in conjunction with importing of pre-existing material. Prior to recording a take with an import track, a cue point 345 can be set to designate where playback on the import track should begin while recording. When "BEGIN RECORD" 135 is selected, the camera 35 channels for the take begin recording as usual, but the import channel 350 does not begin playing until the single channel play button 355 corresponding to that channel is clicked (thus allowing for any delay time from the beginning of recording until the beginning of action). An external switcher is utilized to combine the video signal from the import channel 350 (i.e., the pre-existing material) with that of the live channel to form a composite image for viewing. As well, pause, cue and play controls are available for the import channel 350 while recording so it can be replayed several times if necessary. The preferred embodiment stores the position information for all channels when the import channel 350 begins to play so that, upon playback, the camera 35 channels and the import channel 350 may be queued with the same timing relationship as when recorded.

Editing features of the preferred embodiment directed to compositing of live and imported material include the ability to adjust the time-offset relationship between the various tracks in a take with an import channel 350 during playback. As shown in the exemplary "Playback Screen" 360 of FIG. 13 (as may be provided in conjunction with importing of pre-existing material), a locked graphic 365 is provided which, when selected, "unlocks" the import channel 350 so that it can be dragged along the timeline to effect a change in the synchronization relationship between it and the camera 35 channels. The selection of the locked graphic 365 converts it to an unlocked graphic 370 (as shown in the "Playback Screen" of FIG. 14) and further results in the display of a lock-without-changing graphic 375. To adjust the synchronization of the pre-existing material with the newly recorded live image, the import channel 350 may be moved in a point and drag manner until its image matches up best with the paused camera 35 channels. During this process, the video from the camera 35 channels is paused on the monitors 45. Selecting the unlocked graphic 370 freezes the new synchronization relationship and records the new offset in the take's database record for subsequent playback. If it is determined that no change to synchronization is desired, selection of the lock-without-changing graphic 375 may be made to relock the channels without making or saving any changes to the offset.

It may be realized from the above descriptions that the system and method of the preferred embodiment offers a variety of time-saving features for performing review and editing within respective stored scene/take recordings. Accordingly, in a matter of minutes, as compared to hours or days of known editing means, a director may shoot a scene take, review all recorded camera angles, identify cut points 295 to switch between cameras 35, recall and playback past takes for comparison, and prepare a test or final sequence with respect to that scene/take—all complete with recorded notations of splice positions and comments which may be used in editing actual film once developed.

In a similar manner, larger segments 300 of stored video may be sequenced (e.g., connecting various recordings from different scenes and/or from different takes within scenes, such as all "circle" takes) as part of the overall review, editing and/or preparation of the filmed production (i.e., movie, TV show, etc.). To this end, a preferred embodiment provides a "Search and Sequencing Screen" 380 (as exemplified in FIG. 15) to assist in the identification and selection of stored recording segments 300 which may be desirably sequenced, and to provide a visual means of readily sequencing the desired selections, including means for immediate review, in sequence, of the segments 300 selected.

Searching is accomplished in accordance with a preferred embodiment, through operator selection and entry of search criteria 385 to be utilized; e.g., Scene Name 390, Production Date 395, Comments 400, and/or identification of stored recordings as "Circle" 405 takes. With respect to the Scene Name 390, the system 65 may advantageously provide for entry of partial information in conjunction with a search; accordingly, all stored recording segments 300 which have a scene name containing the entered information anywhere within the name would be identified in the search results as will be further described below. Likewise, with respect to the Comments 400 criterion, the system 65 provides for entry of partial information, e.g., "keywords", for use in the database search; thus, all stored segments 300 for which comments containing the keyword(s) or other partial information are associated would be identified in the search results. With respect to Production Date 395 searching, the system 65 provides for direct entry of a desired date(s) or, utilizing a scrolling menu, provides for selection of the production date(s) to search for from a list of all possible dates in which production took place.

Searching is effected, upon completion of the entry of selection criteria 385 on the "Search and Sequencing Screen" 380, through operator selection of "SEARCH" 410 which results in the system database being scanned for matches to the search criteria 385 selected. Once database searching is complete, the search results are provided in a scrollable search result section 415 in the upper right portion of the "Search and Selection Screen" 380. Search results may be provided to the take sequence level, or may be presented at the enabled camera 35 level within takes. In addition to scene name, take name, camera's enabled, and sequences, the search results further provide production date information for each identified take and comments which have been recorded for any resulting scene, take, camera, and/or sequence. It may also be envisioned that individual take selections may be searchable and likewise identified in the search result section 415.

Preparation of a multi-scene/take sequence may be realized in a preferred embodiment by selecting desired items from the search result section 415, such as by clicking on them with a mouse, and dragging them respectively to one of the numbered sequence boxes 420 in the lower portion of the "Search and Sequencing Screen" 380. For example, and with reference to FIG. 15, the item "Scene 12, Take 2, CAM A" 425 may be selected and dragged to sequence box 420 numbered "7", the next available sequence box 420. Once an item is placed in, i.e., dragged to, a sequence box 420, the system 65 displays a shorthand description of such item on the face of the sequence box 420 graphic, thus providing ready visual indicia of the sequencing prepared to date. For example, it may be seen that sequence box 420 numbered "2" in FIG. 15 has been assigned the item representing scene 12, take 1, camera A. In addition, the number of sequences and their total combined duration is provided in a display 430 below the sequence boxes 420 on the "Search and Sequencing Screen" 380. Items may also be individually selected from the search results box 415 by clicking on a selection box 435 to the left of the scene/take description in the search results box 415; such selection results in a checkmark indicator being placed in the selection box 435 as illustrated, for example with respect to Take 1, Cam A in FIG. 15.

Figure 15:
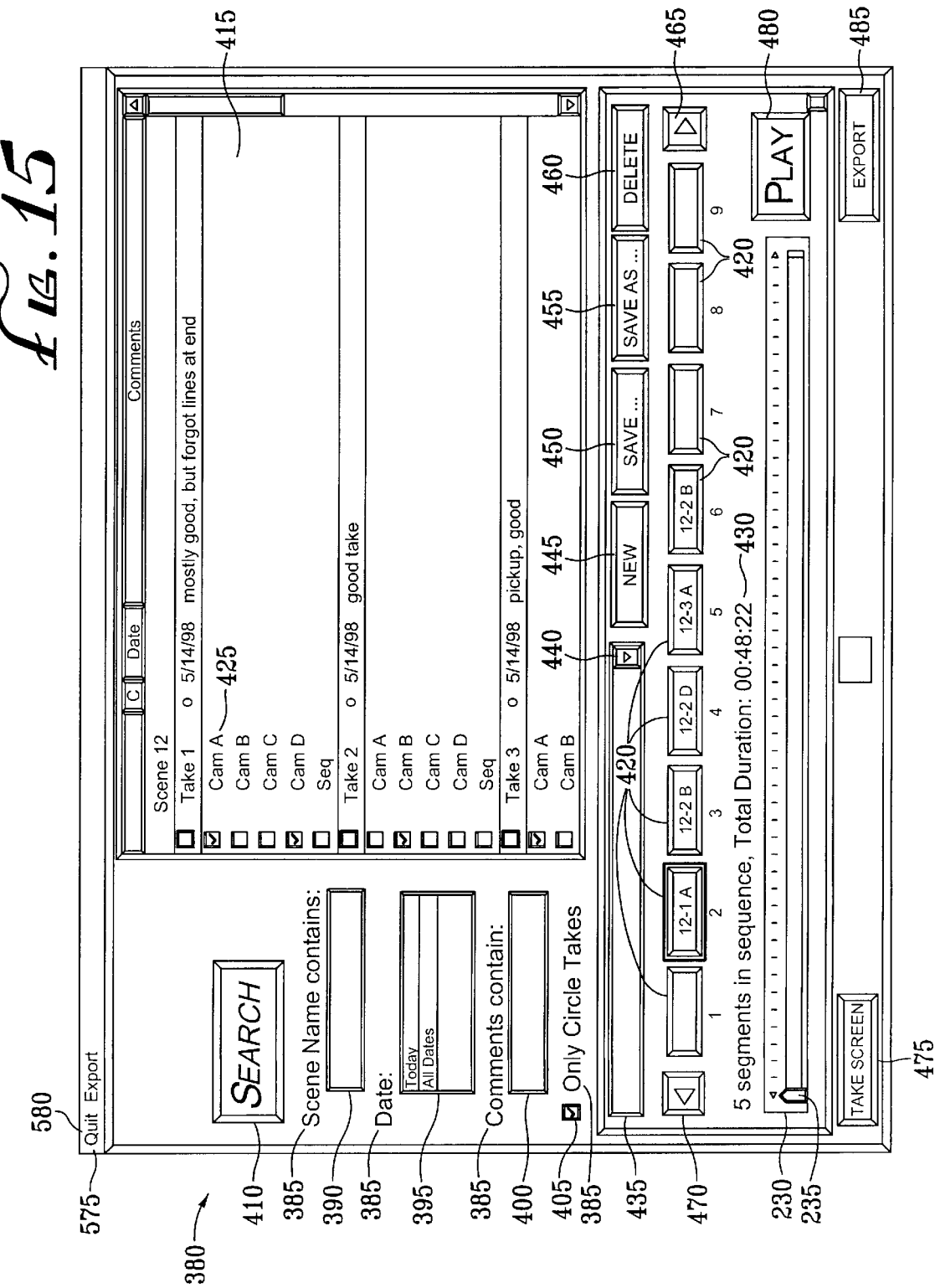
FIG. 15 depicts an exemplary "Search and Sequencing Screen" according to a preferred embodiment herein.

A pull-down menu 440 is also provided (as shown in FIG. 15) which may identify previously stored sequences that may be selected and retrieved for further review, updating and/or exporting. In addition to the pull-down menu 440 for selection of previously stored sequences, and to the right thereof in FIG. 15, the system 65 allows the operator to selectively identify that a new sequence is desired by selecting a "NEW" graphic 445—thus clearing the sequence boxes 420 and allowing new items to be placed therein. As well, a new sequence may be saved and named by the operator by selecting a "SAVE" graphic 450, either upon completion of sequencing or when sequencing must be temporarily stopped and returned to later. A "SAVE AS" graphic 455 is also provided for selection in the event that it is desired to save a modified sequence without losing a previously saved sequence from which it derived. A "DELETE" graphic 460 is further provided to allow for deletion of any no longer needed sequence(s).

As may be seen in FIG. 15, there are nine sequence boxes 420 (numbered 1–9 below the boxes) on the "Search and Sequencing Screen" 380. If greater than 9 items are desired in a sequence, the right arrow graphic 465 to the right of the sequence boxes 420 may be selected to advance the sequence boxes 420 sequentially. In this regard, a first right arrow 465 selection would result in the display of sequence boxes 420 numbered "2–10", a second in sequence boxes 420 numbered "3–11", a third in boxes 420 numbered "4–12", and so on. A left arrow graphic 470 is also provided to the left of the sequence boxes 420 in order to scroll the boxes 420 in the opposite direction, e.g., to review previously sequenced items. A "Take Screen" graphic 475 is also provided for selection should it be desired to return to the "Scene Set-Up Screen" 80, for example, in preparation of recording a new take.

Either upon completion of sequencing or at a point where a review of the actual items sequenced is desired, i.e., viewing of the corresponding stored recordings in sequence, a playback mode may be entered by selecting the "PLAY" graphic 480 on the "Search and Sequencing Screen" 380. As was the case with the "Playback Screen" 150, a tracking control bar 230 is incorporated to provide a means for visually observing playback status in relation to the total sequence duration and for providing a means—the tracking control slider 235—for fast access control between points in the sequence.

As it may be desirable to print a videotape of the sequence selections identified on the "Search & Sequencing Screen" 380, an "EXPORT" 485 option is provided for selection by the operator. Upon selection of "EXPORT" 485, an "Export Screen" 490 is displayed as exemplified in FIG. 16. In a first column 495, a preferred embodiment provides for selection of the source material to be exported. In this regard, either export of a previously edited segment sequence, such as identified in the sequence selection boxes of the "Search and Sequencing Screen" 380, may be made by selecting "Edited Sequence" 500 or export of the "Take Selections" 505 identified in the search results portion of the "Search and Sequencing Screen" 380, such as depicted in FIG. 16, may be made. For further flexibility, a preferred embodiment also allows the operator to control the order in which various recording components of the selected sequence items may be exported. Thus, where a series of multi-camera takes have been sequenced on the "Search and Sequencing Screen" 380, the operator may selectively identify a specific "Clip Order" 510 in which the associated recordings will be exported. For example, the operator may select "ABABA-BAB" to export the recordings from all enabled cameras in each sequenced take prior to exporting recordings for subsequently sequenced takes. Alternatively, the operator may select "AAAA . . . BBBB" to export all enabled camera A recordings from sequenced takes, then all enabled camera B recordings from the sequenced takes, then all enabled camera C recordings, and so on. Finally, the operator may select that only the recordings from a specific enabled camera for the sequenced takes will be exported. In addition to specifying clip order for export, the operator may also selectively choose a "Record Range" 515 for export, thus effecting the export of full clips, action only portions, or selection only portions of each sequenced take where appropriate action markers 190 and/or selection 195 beginning 200 and end points 205 have been inserted as previously described herein.

A second column 520 of the "Export Screen" 490 of a preferred embodiment provides operator control of an associated videotape recording unit to which the exported material will be transferred for recording onto a videotape therein. To this end, the "Export Screen" 490 provides graphic controls 530 to effect tape queuing and operation, including play, rewind, fast forward, fast rewind, stop and pause controls. A "Live" button 535 is also provided, as before, should it be desired to switch the associated monitors 45 back to viewing the live camera 35 action during the export processing.

Once the export material has been defined and the videotape recording unit has been queued for recording, selection of "Export" 540 initiates the sending of the recording sequences as have been defined to the videotape recording unit and initiates recording onto videotape at which point the "Export" 540 graphic is converted on the "Export Screen"

490 to a stop graphic for use should it be desired to stop export recording to the videotape recording unit. A "Record Black" 550 selection is also provided on the "Export Screen" 490 to effect the recording of black space onto an export videotape (e.g., to separate different sequences to be exported to the same videotape). As well, a "Print Report" selection 555 offers a means to obtain a printed listing, including sequencing information, of the recordings that were exported.

Once exporting is completed, selection of "Done" 560 results in exiting of the "Export Screen" 490 and display of the "Search and Sequencing Screen" 380 should it be desired to prepare further sequences for review and/or export. A "Main Screen" selection 565 also causes an exit from the "Export Screen" 490 and results in display of the "Scene Set-up Screen" 80 as previously described and depicted in FIG. 4. Similarly, selection of "Record Standby" 570 from the "Export Screen" 490 of FIG. 16 results in exiting of that screen and display of the "Record Ready Screen" 125 in order to prepare for additional scene/take recordings as previously described with reference to FIG. 5.

It is noted that while the "Export Screen" 490 has been described with respect to exporting of sequenced items to videotape, it may also be envisioned that a generated file representing the sequenced recording items may instead, or also, be exported out of the system 65, for example, to an offsite location, via a network link or other means. In such instance, the offsite location may receive the export file and may view it directly on monitors, record it to videotape, store it, and/or utilize it in any of a variety of ways as a video file.

Aside from the various screens as have been detailed above, a preferred embodiment may also provide pull-down utility menus 575 which are accessible independently from the screen displayed. As may be seen in any of FIGS. 3 through 14, "Quit" 580, "Database" 585 and "Open" 590 selections are provided above the upper left corners of each screen display. Selection of "Quit" 580 (as may also be seen in FIGS. 15 and 16) results in exiting of the system entirely. Selection of "Open" 590 allows direct selection and display of specific screens. Selection of "Database" 585 provides command options which are directed to maintaining the system database, such as delete take, delete screen, clear data base, and other utilities which may, for example, include copy, backup, reconstruct, recover, etc. As may also be seen in any of FIGS. 3 through 14, an Estimated Remaining Capacity display 600 provides information on the remaining overall storage capacity of the system 65 in order to provide a warning to delete old and/or unneeded recordings/data to prevent running out of capacity during subsequent recording.

With reference to FIG. 17, a Direct Control Box 605 (or remote controller box) is depicted. The Direct Control Box 605 may advantageously interconnect to the control computer of the video assist control system 65 to provide manual operation (which may be performed remotely—such as by the director standing away from the system) of certain core functions such as play/stop 610, left and right arrow scrolling through scenes/takes for selection thereof (as described previously with respect to left/right arrow graphics under the scene/take name selectors such as in FIG. 7), a "Live" selector 620 as previously described, camera operation mode selectors 625 (similar to the designators 120 previously described), and a toggle control 630 for a rotating jog/shuttle wheel 635 which alternatively allows the wheel 635 to operate in a jog mode (i.e., step frame by frame through a stored recording selection) or shuttle mode (i.e., control the playback speed of the selected recording). A message display box 640 (e.g., LCD) also displays status information (such as scene name, take name, take duration, operating mode, etc.). The Direct Control Box 605 of the preferred embodiment may also be used to control an external switcher and to log camera cut points during recording which may be displayed upon playback. It is noted that the present video assist control system 65 may include multiple, interconnected Direct Control Boxes 605. It may be envisioned that such a system incorporating such boxes 605 may further provide a priority hierarchy as a means to avoid contention conflicts.

The present video assist systems and methods have been set forth in the form of a preferred embodiment. Other alternative embodiments may be devised, however, and are intended to be within the scope of this application. Furthermore, it is intended that modifications to the disclosed multiple camera video assist control system and method may be made without departing from the scope and spirit of the inventive concepts set forth herein and defined in the appended claims.

What is claimed is:

1. A video assist control system comprising:

a plurality of video signal connections for receiving video signals on different channels respectively;

means for enabling at least one channel for recording of the video signal thereon;

means for entering production information relative to each video signal to be recorded;

means for digitally recording each enabled video signal;

first means for viewing each enabled video signal concurrently with the recording thereof;

means for storing entered production information in association with each enabled signal recorded;

first editing means for selectively identifying action points, cut points, and comments with respect to each video signal concurrently with the recording thereof and wherein the identified action points, cut points, and comments are stored in association with each enabled video signal recorded;

playback means for selectively playing back at least one previously recorded video signal on at least one of a plurality of channels, said playback means further comprising second means for viewing of the at least one previously recorded video signal;

second editing means for selectively identifying edit information for storage in association with an identified segment of the at least one previously recorded video signal played back; and wherein said second edit means further provides assembling means for selectively identifying which one of the plurality of previously recorded video signals will be played for each identified segment and wherein said playback means selectively provides playback of a single video signal comprising the assembled selection of segments from the plurality of previously recorded video signals.

2. A video assist control system comprising:

a plurality of video signal connections for receiving video signals on different channels respectively;

means for enabling at least one channel for recording of the video signal thereon;

means for entering production information relative to each video signal to be recorded;

means for digitally recording each enabled video signal;

first means for viewing each enabled video signal concurrently with the recording thereof;

means for storing entered production information in association with each enabled signal recorded;

first editing means for selectively identifying action points, cut points, and comments with respect to each video signal concurrently with the recording thereof and wherein the identified action points, cut points, and comments are stored in association with each enabled video signal recorded; and, means for searching for at least one previously recorded video signal, wherein said means for searching results in identification of a plurality of previously recorded materials and further comprising sequencing means for selective ordering of the search results to provide a playback sequence.

3. The system of claim 2 further comprising export means for selectively exporting from the system a sequence of previously recorded video signals.

4. The system of claim 3 wherein the export means further comprises means for changing the sequence order to be exported.

5. A video assist control system comprising:

a plurality of video signal connections for receiving video signals on different channels respectively;

means for enabling at least one channel for recording of the video signal thereon;

means for entering production information relative to each video signal to be recorded;

means for digitally recording each enabled video signal;

first means for viewing each enabled video signal concurrently with the recording thereof;

means for storing entered production information in association with each enabled signal recorded;

first editing means for selectively identifying action points, cut points, and comments with respect to each video signal concurrently with the recording thereof and wherein the identified action points, cut points, and comments are stored in association with each enabled video signal recorded;

playback means for selectively playing back at least one previously recorded video signal on at least one of a plurality of channels, said playback means further comprising second means for viewing of the at least one previously recorded video signal;

second editing means for selectively identifying edit information for storage in association with the at least one previously recorded video signal played back; and, a direct control box for remote access, said direct control box comprising further playback means and said second editing means.

6. In a video assist control system having a plurality of video signal connections for receiving real time video signals from a plurality of cameras on different channels, a method comprising the steps of:

selectively enabling at least one channel;

simultaneously digitally recording the real time video signal from each camera on each enabled channel;

storing production information in association with each recorded video signal;

selectively playing back one or more video signals upon completion of recording thereof;

displaying the video signal(s) selectively played back;

selectively associating editing information with one or more video signals selectively played back;

searching previously recorded video signals to identify a plurality of video signals to be retrieved for playback and wherein said searching selectively utilizes previously stored production information and/or edit information;

retrieving a plurality of previously recorded video signals and playing back that plurality of video signals on different respective channels;

editing the retrieved previously recorded video signals to create segments;

assembling the segments by identifying an active channel with respect to each segment created; and playing back the assembled segments so as to view a single video signal comprising the assembled segments wherein each subsequent segment comprises a segment from one of the plurality of previously recorded video signals retrieved on a different channel.

7. In a video assist control system having a plurality of channels for recording and playback of respective video signals, a method for superimposing pre-existing material with video signals being recorded live comprising the steps of:

selectively enabling at least one channel for recording;

importing pre-existing material into a channel not otherwise enabled for recording;

simultaneously digitally recording the video signal on each enabled channel;

playing back the imported pre-existing material concurrently with recording of the video signal on each enabled channel; and, displaying a composite video comprising the pre-existing material in superimposition with the video signal being recorded;

storing position information for all channels upon commencement of playback of the imported pre-existing material;

playing back the video signal recorded on each enabled channel and the pre-existing material in the same timing relationship as when recorded;

adjusting the starting position information of the pre-existing material in relation to the video signals recorded on each enabled channel; and, storing the adjusting position information.

* * * * *